US008108378B2

(12) United States Patent
Ott, IV et al.

(10) Patent No.: US 8,108,378 B2
(45) Date of Patent: Jan. 31, 2012

(54) PODCAST SEARCH ENGINE

(75) Inventors: Edward Stanley Ott, IV, Palo Alto, CA (US); Nathanael Joe Hayashi, Piedmont, CA (US); Matt Fukuda, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 276 days.

(21) Appl. No.: 11/346,777

(22) Filed: Feb. 2, 2006

(65) Prior Publication Data
US 2007/0078884 A1    Apr. 5, 2007

Related U.S. Application Data

(60) Provisional application No. 60/722,600, filed on Sep. 30, 2005.

(51) Int. Cl.
G06F 7/00    (2006.01)
G06F 17/30    (2006.01)

(52) U.S. Cl. ...................................................... 707/707
(58) Field of Classification Search .................. 707/3, 5, 707/1, 100, 999.003, 736, 707; 715/210; 709/227, 231
See application file for complete search history.

(56) References Cited

U.S. PATENT DOCUMENTS

| | | | |
|---|---|---|---|
| 5,948,061 A | 9/1999 | Merriman et al. | |
| 6,285,985 B1 | 9/2001 | Horstmann | |
| 6,374,260 B1 | 4/2002 | Hoffert et al. | |
| 6,385,592 B1 | 5/2002 | Angles et al. | |
| 6,751,673 B2 | 6/2004 | Shaw | |
| 6,874,018 B2 | 3/2005 | Handong | |
| 6,922,702 B1 | 7/2005 | Jensen et al. | |
| 6,931,434 B1 | 8/2005 | Donoho et al. | |
| 6,944,611 B2 | 9/2005 | Flank et al. | |
| 7,149,969 B1 * | 12/2006 | Thrane ......................... | 715/255 |
| 2002/0069218 A1 | 6/2002 | Sull et al. | |
| 2002/0072965 A1 | 6/2002 | Merriman et al. | |
| 2002/0124098 A1 | 9/2002 | Shaw | |
| 2002/0194200 A1 | 12/2002 | Flank et al. | |
| 2003/0023564 A1 | 1/2003 | Padhye et al. | |
| 2003/0028433 A1 | 2/2003 | Merriman et al. | |
| 2003/0088778 A1 | 5/2003 | Lindqvist et al. | |
| 2003/0177503 A1 | 9/2003 | Sull et al. | |
| 2003/0212759 A1 | 11/2003 | Wu | |
| 2004/0125124 A1 | 7/2004 | Kim et al. | |

(Continued)

FOREIGN PATENT DOCUMENTS
CA    2326342 A1    10/1999
(Continued)

OTHER PUBLICATIONS

U.S. Appl. No. 11/357,256, filed Feb. 17, 2006, Ott IV.
(Continued)

*Primary Examiner* — Mohammad Ali
*Assistant Examiner* — Alexey Shmatov
(74) *Attorney, Agent, or Firm* — James J. DeCarlo; Greenberg Traurig, LLP

(57) ABSTRACT

Systems and methods are provided for subscribing to podcast feeds from a single location. A server-based search engine is provided that identifies podcasts located throughout a network that are available to a user's rendering device and presents the user with a user interface from which the user can search for podcasts, subscribe to an identified podcast, listen to an identified podcast, or obtain additional information related to an identified podcast.

24 Claims, 18 Drawing Sheets

U.S. PATENT DOCUMENTS

| | | | |
|---|---|---|---|
| 2004/0126021 A1 | 7/2004 | Sull et al. | |
| 2004/0128317 A1 | 7/2004 | Sull et al. | |
| 2004/0172324 A1 | 9/2004 | Merriman et al. | |
| 2004/0172331 A1 | 9/2004 | Merriman et al. | |
| 2004/0172332 A1 | 9/2004 | Merriman et al. | |
| 2005/0038702 A1 | 2/2005 | Merriman et al. | |
| 2005/0193408 A1 | 9/2005 | Sull et al. | |
| 2005/0193425 A1 | 9/2005 | Sull et al. | |
| 2005/0203927 A1 | 9/2005 | Sull et al. | |
| 2005/0204385 A1 | 9/2005 | Sull et al. | |
| 2005/0210145 A1 | 9/2005 | Kim et al. | |
| 2006/0064716 A1 | 3/2006 | Sull et al. | |
| 2006/0116924 A1 | 6/2006 | Angles et al. | |
| 2006/0190616 A1* | 8/2006 | Mayerhofer et al. | 709/231 |
| 2006/0265409 A1* | 11/2006 | Neumann et al. | 707/100 |
| 2006/0265503 A1* | 11/2006 | Jones et al. | 709/227 |
| 2006/0265637 A1* | 11/2006 | Marriott et al. | 715/500.1 |
| 2007/0078712 A1 | 4/2007 | Ott et al. | |
| 2007/0078713 A1 | 4/2007 | Ott et al. | |
| 2007/0078832 A1 | 4/2007 | Ott et al. | |
| 2007/0088832 A1 | 4/2007 | Tsang et al. | |
| 2007/0116036 A1* | 5/2007 | Moore | 370/462 |
| 2007/0204308 A1* | 8/2007 | Nicholas et al. | 725/86 |

FOREIGN PATENT DOCUMENTS

| | | |
|---|---|---|
| EP | 1 251 441 A2 | 10/2002 |
| EP | 1307838 A1 | 7/2003 |
| KR | 2004 0074623 | 8/2004 |
| KR | 2005 084756 A | 8/2005 |
| WO | WO 9952056 A1 | 10/1999 |
| WO | WO0137189 A2 | 5/2001 |
| WO | WO 0213121 A1 | 2/2002 |
| WO | WO02054698 A2 | 7/2002 |
| WO | WO2005065237 A2 | 7/2005 |
| WO | WO 2006/037965 | 9/2006 |
| WO | WO2007041073 A1 | 4/2007 |
| WO | WO2007041074 A1 | 4/2007 |
| WO | WO2007041260 A1 | 4/2007 |

OTHER PUBLICATIONS

U.S. Appl. No. 11/341,985, filed Jan. 27, 2006, Hayashi et al.
U.S. Appl. No. 11/341,982, filed Jan. 27, 2006, Hayashi et al.
U.S. Appl. No. 11/342,152, filed Jan. 27, 2006, Hayashi et al.
U.S. Appl. No. 11/341,976, filed Jan. 27, 2006, Hayashi et al.
U.S. Appl. No. 11/341,065, filed Jan. 27, 2006, Hayashi et al.
U.S. Appl. No. 11/347,626, filed Feb. 2, 2006, Ott IV, et al.
U.S. Appl. No. 11/346,777, filed Feb. 2, 2006, Ott IV, et al.
U.S. Appl. No. 11/417,610, filed May 3, 2006, Hayashi et al.
Courtesy Copy, PCT/US2006/037318, PCT International Search Report dated Jan. 26, 2007.
Courtesy Copy, PCT/US2006/037965, PCT International Search Report dated Feb. 15, 2007.
Notification Concerning Transmittal of International Preliminary Report on Patentability (PCT/US06/037319) dated Apr. 10, 2008.
Written Opinion of the International Searching Authority, or the Declaration dated Feb. 15, 2007 (PCT/US2006/037965).
Notification Concerning Transmittal of International Preliminary Report on Patentability (Chapter I of The Patent Cooperation Treaty) dated Apr. 10, 2008 (PCT/US2006/037965).
Written Opinion of the International Searching Authority, or the Declaration dated Jan. 26, 2007 (PCT/US2006/037318).
Notification Concerning Transmittal of International Preliminary Report on Patentability (Chapter I of the Patent Cooperation Treaty) dated Apr. 1, 2008 (PCT/US2006/037318).
Notification of Transmittal of the International Search Report and the Written Opinion of the International Searching Authority, or the Declaration dated Jan. 25, 2007 (PCT/US2006/037319).
Shevade B, et al. A Collaborative Annotation Framework: IEEE International Conference on Multimedia and Expo, 2005. ICME 2005. Amsterdam, The Netherlands, Jul. 6-8, 2005, IEEE, Piscataway, NJ, USA; 4 pages.
Golder S, et al., "Structure of Collaborative Tagging Systems" Internet Citation: Aug. 18, 2005; pp. 1-8 http://www.hpl.hp.com/research/idl/papers/tags/tags.pdf.
Supplementary European Search Report (EP 06 80 4126) dated Oct. 13, 2010; 3 pages.

\* cited by examiner

```xml
<rss version="2.0" xmlns:dc="http://purl.org/dc/elements/1.1/" xmlns:itunes="http://www.itunes.com/DTDs/Podcast-1.0.dtd">
  <channel>
    <title>GameSpot presents The HotSpot</title>
    <link>http://www.gamespot.com/</link>
    <description>GameSpot editors recap the hottest news and trend in the gaming industry from the past week!</description>
    <generator>GameSpot</generator>
    <image>
      <title>GameSpot</title>
      <url>http://img.gamespot.com/gamespot/shared/promos/misc/gs_logo.gif</url>
      <width>135</width>
      <height>44</height>
    </image>
    <language>en-us</language>
    <itunes:link rel="image" type="video/jpeg" href="http://img.gamespot.com/gamespot/images/2005/features/hotspot/shared/hotspot_logo.jpg" />
    <copyright>2005 CNET Networks, Inc.</copyright>
    <itunes:category text="Arts & Entertainment" />
    <itunes:category text="Games" />
    <itunes:category>
    <itunes:explicit>no</itunes:explicit>
    <itunes:subtitle />
    <itunes:summary>GameSpot editors recap the hottest news and trends in the gaming industry from the past week!</itunes:summary>
    <itunes:author>GameSpot.com</itunes:author>
    <itunes:owner>
      <itunes:name />
      <itunes:email />
    </itunes:owner>
    <item>
      <title>GameSpot presents The HotSpot - 7/20/05</title>
      <itunes:author>GameSpot.com</itunes:author>
      <itunes:subtitle />
      <itunes:summary>Join Executive Editor Greg Kasavin, Senior Editor Jeff Gerstmann, Features Editor Bob Colayco, and Features Producer Rich Gallup as they discuss the Hot Coffee brouhaha, the ups and downs of gaming stocks, inflation in the land of Azeroth, and more!</itunes:summary>
      <link>http://www.gamespot.com/features/6129513/index.html</link>
      <guid>http://download.gamespot.com/d4/free/podcast/hotspot_072005.mp3</guid>
      <comments />
      <description>Join Executive Editor Greg Kasavin, Senior Editor Jeff Gerstmann, Features Editor Bob Colayco, and Features Producer Rich Gallup as they discuss the Hot Coffee brouhaha, the ups and downs of gaming stocks, inflation in the land of Azeroth, and more!</description>
      <dc:creator>GameSpot.com</dc:creator>
      <dc:date>2005-07-20T18:00Z</dc:date>
      <category>News</category>
      <itunes:category text="Arts & Entertainment" />
      <itunes:category text="Games" />
      <itunes:category>
      <itunes:explicit>no</itunes:explicit>
      <itunes:duration>14:55</itunes:duration>
      <itunes:keywords>video games, gaming, GameSpot, Hot Coffee</itunes:keywords>
      <pubDate>Wed, 20 Jul 2005 11:00:00 GMT</pubDate>
      <enclosure url="http://download.gamespot.com/d4/free/podcast/hotspot_072005.mp3" length="14345195" type="audio/mpeg" />
    </item>
    ...
  </channel>
</rss>
```

FIG. 2

```
<?xml version="1.0" encoding="UTF-8"?>
<!DOCTYPE pcast PUBLIC "-//Apple Computer//DTD PCAST 1.0//EN" "http://www.itunes.com/DTDs/pcast-1.0.dtd">
<pcast version="1.0">
<channel>
<link rel="feed" type="application/rss+xml" href="http://del.icio.us/rss/gu.st/log%2Bsystem:media:audio" />
<title>gu.st</title>
<category>Blog</category>
<subtitle>Me. And others.</subtitle>
</channel>
</pcast>
```

PODCAST SEARCH ENGINE

RELATED APPLICATIONS

This application claims the benefit of U.S. Provisional Application No. 60/722,600, filed Sep. 30, 2005 which application is hereby incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The expansion of the Internet and the World Wide Web ("web") has given computer users the enhanced ability to listen to and to watch various different forms of media through their computers. This media can be in the form of audio music, music videos, television programs, sporting events or any other form of audio or video media that a user wishes to watch or listen to.

Podcasting is a method of publishing digital media, typically audio programs, via the Internet, allowing users to subscribe to a feed of new files (e.g., .MP3s audio files). The word "podcasting" became popular in late 2004, largely due to automatic downloading of audio onto portable players or personal computers. Podcasting is distinct from other types of online media delivery because of its subscription model, which uses a "feed," which may also be referred to as a "podcast," to describe, identify and deliver an media file. A feed, in this context, refers to a list of files that can be easily interpreted to identify new files in the list as the files are added over time. Thus, one is said to subscribe to a feed because as new files are added to the list, the subscriber is notified of the new file and, in some cases, the new file is automatically delivered. The feed may exist as a discrete file, such as an .RSS file discussed below, or it may exist as part of a some other data format or element.

Podcasting enables independent producers to create self-published, syndicated media, such as "radio shows," and gives broadcast news, radio, and television programs a new distribution method. Listeners may subscribe to feeds using "podcatching" software (a type of aggregator), which periodically checks for and downloads new content automatically. Most podcatching software enables the user to copy podcasts to portable music players. Most digital audio player or computer with audio-playing software can play podcasts. From the earliest RSS-enclosure tests, feeds have been used to deliver video files as well as audio. By 2005 some aggregators and mobile devices could receive and play video, but the "podcast" name remains most associated with audio. Other names are sometimes used for casting other forms of media, such as blogcasting for text and vcasting or vodcasting for video. For the purposes of this application, podcast is used in its most general sense to refer to a feed of new files in any format (e.g., .MP3, .MPEG, .WAV, .JPG) and containing any content (e.g., text-based, audible, visual or some combination) that can be subscribed to by a client. Also, for the purposes of this discussion an individual podcast may be referred to as a series, and each distinct new file in the series may be referred to as an individual episode of the series.

Podcasting is supported by underlying feed formats such as RSS. RSS is a family of XML file formats for web syndication used by (amongst other things) news websites and weblogs. The abbreviation is used to refer to the following standards: Rich Site Summary (RSS 0.91); RDF Site Summary (RSS 0.9 and 1.0); and Really Simple Syndication (RSS 2.0).

The technology behind RSS allows a client, in a client-server environment, to subscribe to RSS feeds on websites maintained by remote servers; these are typically sites that change or add content regularly. To use this technology the client needs some type of aggregation service or aggregator. The aggregator allows a client to subscribe to the podcasts that the client wants to get updates (i.e. future media files in the feed) on. Unlike typical subscriptions to pulp-based newspapers and magazines, your RSS subscriptions are free, but they typically only provide a line or two of each article or post along with a link to the full article or post.

The RSS formats provide web content or summaries of web content together with links to the full versions of the content, and other meta-data. This information is delivered as an XML file called RSS feed, webfeed, RSS stream, or RSS channel. In addition to facilitating syndication, RSS allows a website's frequent readers to track updates on the site using an aggregator.

RSS is widely used by the weblog community to share the latest episodes' headlines or their full text, and even attached multimedia files. In mid 2000, use of RSS for podcasting text spread to many major news organizations, including Reuters, CNN and the BBC, until under various usage agreements, providers allow other websites to incorporate their "syndicated" headline or headline-and-short-summary feeds. RSS is now used for many purposes, including marketing, bug-reports, or any other activity involving periodic updates or publications.

A program known as a feed reader or aggregator can check RSS-enabled webpages on behalf of a user and display any updated articles that it finds. It is now common to find RSS feeds on major web sites, as well as many smaller ones.

Client-side readers and aggregators are typically constructed as standalone programs or extensions to existing programs like web browsers. Such programs are available for various operating systems.

Podcasting has become a very popular and accepted media delivery paradigm. This success has caused the number and variety of podcasts available to clients to grow exponentially. Potential podcast consumers are now confronted with the problems of how to find podcasts, how to organize and manage their podcast subscriptions; and how to listen to episodes efficiently and easily. Podcast publishers are also confronted with problems including how to effectively market their podcasts, how to generate income from their podcasts, how to easily create and disseminate podcasts, how to support different feed formats and device needs, and how to manage bandwidth and storage costs.

SUMMARY OF THE INVENTION

An embodiment of the present invention includes a method and system for subscribing to podcast feeds from a single location. A search engine is provided that identifies podcasts available to the user and presents the user with a user interface from the user can subscribe to an identified podcast, listen to an identified podcast, or obtain additional information related to the identified podcast.

In another embodiment, a server-based search engine is provided that searches data related to both podcasts and each podcasts' constituent episodes. The results are stored in a local feed database and periodically updated. The search results stored include most or all of the searchable descriptive information provided by the podcast, including information provided concerning the episodes of the podcast. The search engine receives user-generated search requests and searches the stored database for matching podcasts and matching episodes which are then displayed to the user.

In another embodiment, a method of adaptively searching podcasts and podcast episodes is provided. In the method, a set of podcasts to be searched is identified. Each podcast and episode may then be associated with a tag. The association may be done repeatedly by different consumers of the podcast episodes. Upon receipt of a search request, the information provided by the publishers of the podcasts and the tag associated with the podcasts are used to generate search results. The search results include podcast and episodes that contain publisher-provided information that match the search criteria used. The search results also include recommendations of podcasts of episodes based on the tags associated with the podcast and episodes that contain publisher-provided information that match the search criteria used as well as recommendation of podcasts and episodes associated with tags that match the search criteria.

BRIEF DESCRIPTION OF THE DRAWINGS

The following drawing figures, which form a part of this application, are illustrative of embodiments of the present invention and are not meant to limit the scope of the invention in any manner, which scope shall be based on the claims appended hereto.

FIG. 2 shows the contents, in .XML, of an exemplary RSS feed file in accordance with an embodiment of the present invention;

FIG. 17 shows the contents of an exemplary file that may be transmitted to a processor and interpreted to subscribe the processor to a podcast in accordance with an embodiment of the present invention.

DETAILED DESCRIPTION OF PREFERRED EMBODIMENTS

In general, the present invention relates to a system and method for delivering media over a network and for enhancing a user's experience in experiencing the media that is transferred over the network. Systems are disclosed wherein a user has access to all podcasts that he or she has subscribed to, regardless of what particular user device that the subscription is delivered to, and a means for managing those subscriptions easily. Systems also allow a publisher to create podcasts easily with a minimum of cumbersome intermediary steps.

Figure 1:
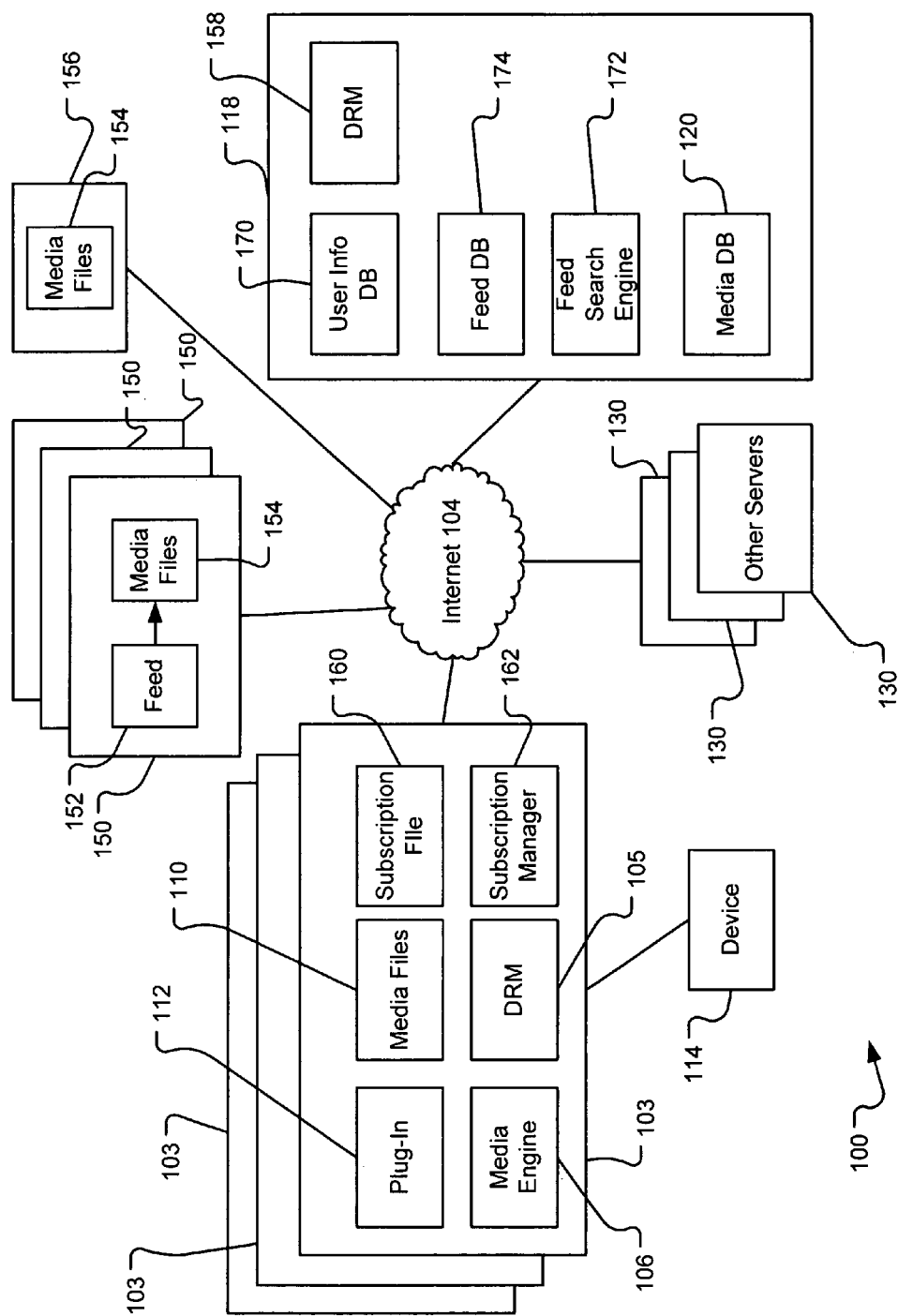
FIG. 1 is a schematic illustrating an exemplary network architecture according to one embodiment of the present invention.

A certain embodiment of the present invention will now be discussed with reference to the aforementioned figures, wherein like reference numerals refer to like components. Referring now to FIG. 1, the architecture of one embodiment of the present invention is shown in schematic form. As can be seen in FIG. 1, a system 100 according to one embodiment of the present invention is shown. In general the system 100 allows users to experience, share and otherwise utilize different media. Although numerous exemplary embodiments will be discussed in terms of music and/or audio files, this invention can also be utilized with any form of audio, video, digital or analog media content, as well as any other media file type now known or to become known.

Each user utilizes a processor or computing device 103, such as personal computer (PC), web enabled cellular telephone, personal digital assistant (PDA) or the like, coupled to the Internet 104 by any one of a number of known manners. Furthermore, each processor 103 preferably includes an Internet browser (not shown), such as that offered by Microsoft Corporation under the trade name INTERNET EXPLORER, or that offered by Netscape Corp. under the trade name NETSCAPE NAVIGATOR, or the software or hardware equivalent of the aforementioned components that enable networked intercommunication between users and service providers and/or among users. Each processor also includes a media engine 106 that, among other functions to be further described, provides the ability to convert information or data into a perceptible form and manage media related information or data so that user may personalize their experience with various media.

A media engine 106 may be incorporated into processor 103 by a vendor of processor 103, or obtained as a separate component from a media engine provider or in some other art recognized manner. As will be further described below, it is contemplated that media engine 106 may be a software application, or a software/firmware combination, or a software/firmware/hardware combination, as a matter of design choice, that serves as a central media manager for a user and facilitates the management of all manner of media files and services that the user might wish to access either through a computer or a personal portable device or through network devices available at various locations via a network. As used herein, the term media file is used generically to refer to an item of media, as well as associated metadata and/or network location information for that item. A processor 103 may also be referred to as a rendering device 103 to indicate that it is adapted to retrieve and render media files from the network.

Processor 103 also may include storage of local media files 110 and/or other plug-in programs that are run through or interact with the media engine 106. Processor 103 also may be connectable to one or more portable media devices 114 such as a compact disc player and/or other external media file player, commonly referred to as an MP3 player, such as the type sold under the trade name iPod by Apple Computer, Inc., that is used to portably store and play media files.

Local files may be stored on a mass storage device (not shown) that is connected to the processor 103 or alternatively may be considered part of the processor 103. The mass storage device and its associated computer-readable media, provide non-volatile storage for the processor 103. Although the description of computer-readable media contained herein refers to a mass storage device, such as a hard disk or CD-ROM drive, it should be appreciated by those skilled in the art that computer-readable media can be any available media that can be accessed by the processor 103.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Additionally, processor 103 may contain Digital Rights Management software (DRM) 105 that protects the copyrights and other intellectual property rights of the user's media files by enabling secure distribution and/or preventing or hampering illegal distribution of the media files. In one embodiment, DRM 105 encrypts or decrypts the media files for controlled access by authorized users, or alternatively for marking the content with a digital watermark or similar method so that the content can not be freely distributed. Media engine 106 preferably uses the DRM information to ensure that the media files being experienced through media engine 106 are not copied to or shared with users that are unauthorized to listen to or view the content.

The processor 103 includes the software necessary to subscribe to podcasts. In the embodiment shown, the processor 103 includes a subscription file 160, such as an OPML file. The subscription file 160 maintains information that identifies what podcasts the user has subscribed to. The subscription file 160 may include a list of feeds 152 and the feed locations.

The processor 103 also includes a subscription manager 162. The subscription manager 162 can perform the podcatching functions of an aggregator and can periodically poll the feeds identified in the subscription file 160 to determine if new episodes of the podcast are available. Upon determination that a new episode is available, the subscription manager 162 may notify the user or may automatically download the episode to the processor.

The system 100 also includes subscription server 118. In addition to serving media over the Internet 104 to the user, subscription server 118 also includes a media database 120, which in addition to storing the actual media files also stores or communicates with storage devices storing various metadata attributes of each particular piece of media. Database 120 may be distributed over multiple servers provided with mass storage devices or other forms of computer-readable media or contained in a large mass storage device accessible for example via the subscription server 118. Other servers 130 make other content and services available and may provide administrative services such as managing user logon, service access permission, digital rights management, and other services made available through a service provider. Although some of the embodiments of the invention are described in terms of music, embodiments can also encompass any form of streaming or non-streaming media including but not limited to news, entertainment, sports events, web page or perceptible audio or video content. It should be also be understood that although the present invention is described in terms of media content and specifically audio content, the scope of the present invention encompasses any content or media format heretofore or hereafter known.

The subscription server 118 also includes a database 170 of user information. The user information database 170 includes information about users that is collected from users or generated by the subscription server 118 as the user interacts with the subscription server 118. In one embodiment, the user information database 170 includes user information such as user name, gender, e-mail and other addresses, user preferences, etc. that the user may provide to the subscription server 118. In addition, the server 118 may collect information such as what podcasts the user has subscribed to, what searches the user has performed, how the user has rated various podcasts, etc. In effect, any information related to the user and the podcasts that user subscribes to that is available to the subscription server 118 may be stored in the user information database 170.

The user information database 170 may also include information about a user's devices 114. The information allows the subscription server 118 to identify the device and differentiate it from the processor 103. Furthermore, it is anticipated that a single user may have multiple different processors 103 and each processor 103 may be associated with different information. For example, a user may subscribe to a news podcast on a mobile device such as a smart phone 103 or similar Internet connected mobile device 103 and may subscribe to a gaming podcast on a home computer 103. The user information database 170 contains all this information. In one embodiment, the user information database 170 may include the same information contained in the processor's subscription file 160 for each processor 103 associated with the user. The user information database 170 may even include one or more files in the OPML file format for each user.

In the embodiment shown, the subscription server 118 includes a feed database 174. The feed database 174 may include a list of podcasts known to the server 118. This list may be periodically refreshed as the server 118 searches for new feeds 152 and for feeds 152 that have been removed from access to the internet 104. Such a feed database 174 may not be necessary if the searching ability of the server 118 is sufficient to quickly provide user with updated and accurate feed information in response to a user search. The feed database 174 may include all of the information provided by the feed 152. In addition, the feed database 174 may include other information generated by the subscription server 118 or by users. Thus, the feed database 174 may contain information not known to or generated by the publisher of the feed 152.

In one embodiment, the databases 120, 174, 170 may be separate and distinct databases, while in an alternative embodiment some or all of the databases 120, 174, 170 may be combined into a single database. The databases 120, 174, 170 part of the server 118 or may be located on separate computing devices that are in communication with the server 118.

In an embodiment, the feed database 174 includes additional information regarding feeds 152 in the form of "tags." A tag is a keyword chosen by a person accessing the subscription server 118 to describe a particular feed 152. The tag can be any word or combination of key strokes. Each tag submitted to the subscription server may be recorded in the feed database 172 and associated with the feed the tag describes. Tags may be associated with a particular feed 152 (e.g., a series tag) or associated with a specific media file 154 within the feed 152 (e.g., an episode tag). Tags will be discussed in greater detail below.

Since tags can be any keyword, a typical name for a category, such as "science" or "business," may also be used as a tag and in an embodiment the initial tags for a feed are automatically generated by taking the category designations from a feed and using them as the initial tags for the feed. However, note that tags are not a hierarchical category system that one "drills down" through. Tags are not hierarchically related as is required in the typical categorization scheme. Tags are also cumulative in that the number of users that identify a series or an episode with a specific tag are tracked. The relative importance of the specific tag as an accurate description of the associated content (i.e., series or episode) is based on the number of users that associated that tag with the content.

In an embodiment, consumers of feeds 152 are allowed to provide information to be associated with feeds or with particular episodes of feeds. Thus, the user after consuming data may rate an episode, say on a scale of 1-5 stars, write a review of the episode, and enter tags to be associated with the episode. All this consumer-generated data may be stored in the feed database 174 and associated with the appropriate episode for use in future searches.

The subscription server 118 includes a search engine 172. In an embodiment, the search engine 172 performs multiple functions including crawling the network 104 to identify feeds and episodes of feeds on the network 104, retrieving feed information and storing it in the feed database 174, and providing a means for processors 103 to easily search the feed database 174 for feeds and episodes.

Because of their very nature, feeds 152 are expected to change over time through the addition of new media files 154 as episodes of the feed 152. In an embodiment, the search engine 172 periodically and automatically crawls the network 104 to find new feeds 152 and for previously identified feeds 152 that have changed since the last time the search engine 172 inspected the feed 152. When crawling the network 104, the search engine 172 can use any network searching or crawling methods, such as for example, the method for crawling information on a network described in commonly owned U.S. Pat. No. 6,021,409, titled "METHOD FOR PARSING, INDEXING AND SEARCHING WORLD-WIDE-WEB PAGES." The search engine 172 creates one or more new entries in the feed database 174 for every new feed 152 it finds. Initially, the entry or entries contain the location of the feed, an identifier of the feed (such as its name), and some or all of the information contained in or otherwise provided by or associated with the feed 152. For example, for an RSS feed this information may include some or all of the metadata within the RSS feed file. This feed information is retrieved by the search engine 172 from the feed 152 and stored in the feed database 174 so that the feed database contains some or all of the information provided in the feed 152. Such information may include the feed description, episode descriptions, episode locations, etc.

An automatic analysis may or may not be performed to match the feed 152 to known tags based on the information provided in the feed 152. For example, in an embodiment some RSS feeds include a category element and the categories listed in that element for the feed are automatically used as the initial tags for the feed. While this is not the intended use of the category element, it is used as an initial tag as a starting point for the generation of more accurate tags for the feed. Note that client searches on terms that appear in the feed 152 will return that feed as a result, so it is not necessary to provide tags to a new entry for a client search to work properly. Initially no ratings information or user reviews are associated with the new entry. The manager of the subscription server may solicit additional information from the publisher such as the publisher's recommended tags and any additional descriptive information that the publisher wishes to provide but did not provide in the feed 152 itself.

The feed database 174 may also include such information as reviews of the quality of the feeds, including reviews of the series as a whole and reviews specific to each episode in a given feed 152. The review may be a rating such as a "star" rating and may include additional descriptions provided by users.

In addition to maintaining information specific to series and individual episodes within the series, the feed database 174 may also include information associated with publishers of the feeds, sponsors of the feeds and/or episodes, topics discussed in the feeds or episodes or people in the feeds or episodes.

In order to facilitate client searches, the feed search engine 172 provides a graphical user interface to user's processors 103 allowing the user to search for and subscribe to feeds 152 using the subscription server 118. In one embodiment, the graphical user interface may be an .HTML page served to a processor 103 for display to the user via a browser. Alternatively the graphical user interface may be presented to the user through some other software on the processor 103. An example of a graphical user interface presented to a user by a browser is discussed with reference to FIG. 3. Through the graphical user interface, the feed search engine 172 receives user search criteria. The search engine 172 then uses the search criteria as parameters to identify feeds 152 that meet the user's criteria. The search may include an active search of Internet 104, a search of the feed database 174, or some combination of both 174. The search may include a search of the descriptions provided in the feed 152 of the series and each particular episode in the series. The search may also include a search of the third party-provided tags, ratings, and reviews and other information associated with feeds 152 listed in the feed database 174 but not provided by the feeds 152 themselves. The results of the search are then displayed to the user.

In one embodiment of the present invention, similar to the DRM software 105 located on the user's processor 103, the subscription server may maintain its own DRM software 158 which tracks the digital rights of media files located either in the media database 120 or stored on a user's processor. Thus, for example, before the subscription server 118 streams or serves up or transfers any media files to a user, it validates the rights designation of that particular piece of media and only serves streams or transfers the file if the user has the appropriate rights. This may be determined by an inspection of information contained on the processor 103, in the user information database 170, or both.

The system 100 also includes a number of servers 150, that are remote from the processors 103 and the subscription server 118, that publish podcasts. In one embodiment remote means remote in the network sense in that each server 150, each processor 103 and the subscription server 118 may be accessed using different domain names as their network locator, such as the Uniform Resource Locator (URL). For example, the subscription server 118 may be accessed by a URL of "http://podcast.yahoo.com" while each server 150 may have a different URL such as "www.abcnews.com" and "www.itunes.com". The processors 103 may be have dedicated URLs or may be devices that can intermittently connect to the internet and are given temporary URLs by the system through which they connect to the internet. In another embodiment, Internet Protocol (IP) addresses for each processor 103, server 150 and the subscription server 118 are different, indicating that the devices are remote from each other.

The servers 150 include one or more feeds 152, such as RSS feeds, that are accessible through the network 104, such as the Internet as shown. The feeds 152, as will be described in greater detail below, include information about the feed (series information) as well as information about the various media files 154 (i.e., episodes) of the feed 152. The feed 152 also identifies the media files 154 so that they can be retrieved by a subscription manager on a processor 103. The media file 154 may reside on the podcast server 150 with the feed 152, or may be located on yet another server 156 that is, in fact, remote from the podcast server 150 with the feed 152.

As illustrated in FIG. 1, each user's processor 103, the subscription server 118 and podcast servers 150, as well as the other servers 130, 156 are communicatively connected via the Internet 104. In alternate embodiments, different components of the system may be communicatively coupled differently, for example each may be coupled directly to each other wirelessly or by a local or wide area network (WAN) or the like. Additionally, functional components can be distributed so that certain functions of the search engine 172 may be performed at subscription server 118, or distributed in modular fashion for operation at various locations throughout the system 100. Thus, the description herein of a function or component being associated with a particular device or component or location is merely one possible embodiment.

The search engine 172 also provides users with additional functionality and convenience. The user interface provided by the search engine 172 to the user's processor 103 allows the user to subscribe to a displayed feed (via a subscribe button), listen to an episode of a displayed feed (via listen button), and obtain the complete information on the feed (via clicking on the hyperlinked title) from the same interface. A user need not know where the feed resides on the Internet and need only to interact with the search engine's user interface to perform these actions. Furthermore, the user does not need to explicitly direct his computer to access the publisher's site to subscribe, listen or obtain additional information on a feed.

FIG. 2 is an embodiment of an feed 152 conforming to the RSS standard and written in .XML. Shown in FIG. 2 are the .XML declarations that identify the .XML specification and allow an .XML execution engine to interpret the remainder of the file, which is the first line of the document. .XML, or XML for short, is a markup language that allows different elements of information to be identified by delimiting the information between statements, also called XML tags, that identify the element to the XML execution engine.

The first line shown in the feed 152 includes a header section that identifies the RSS standard and the document type definition to be used when interpreting the feed 152. In this case it also identifies an ITUNES standard published by Apple Computer.

The next line begins the channel section with the </channel> statement. The channel element contains metadata that describe the channel itself, telling what the channel is and who created it. The channel is a required element that includes the name of the channel, its description, its language, and a URL. The URL is normally used to point to the channel's source of information. The channel element contains the remaining channel tags, which describe the channel and allows it to be displayed in HTML. The title can be treated as a headline link with the description following. The Channel Language definition allow aggregators to filter news feeds and gives the rendering software the information necessary to display the language properly.

For example, you can include nine optional elements in a RSS 0.91 specification/channel definition. Some examples are PICS Rating, Copyright Identifier, Publication Date, and Webmaster. You can use these additional elements for a variety of purposes. For example, sites that aggregate content can use this additional meta information to allow users to filter news feeds on the basis of Platform for Internet Content Selection (PICS) ratings.

In the embodiment shown, the channel, that is the feed 152 or series, is given the title "GameSpot presents The HotSpot". A link to www.gamespot.com is provided along with a short description applicable to the feed 152. The publisher, is identified as Gamespot.

The image element is an optional element that is usually used to include the logo of the channel provider. The image's title, URL, link, width, and height tags allow renderers to translate the file into HTML. The title tag is normally used for the image's ALT text. In the embodiment shown an image file is identified as the file "gs_logo.gif" and its URL is provided.

In the embodiment shown, after the image element some additional elements are provided that are associated with the ITUNES standard for RSS feeds. These elements include the identification of an additional image associated with the feed 152, a language designation, a category and subcategory designation, a summary (that is identical to the channel description) and an author designation.

After the ITUNES element, the first item element is shown. Items usually form the dynamic part of an RSS file and identifies an episode of the feed 152. While channel, image, and text input elements create the channel's identity and typically stay the same over long periods of time, items are rendered as news headlines, and the channel's value depends on their changing fairly frequently. The item title is normally rendered as a headline that links to an associated media file 154 whose URL is provided by the item link. The item description is commonly used for either a summary of the content or for commentary on the content. For example, news feed channels use the description to highlight the content of news articles, usually on the channel owner's site, and Web log channels use the description to provide commentary on a variety of content, often on third-party sites.

In FIG. 2, only the first item is shown. That item includes the title of the episode—"GameSpot present The HotSpot—7/20/05", the author of the episode, a description of the episode—"Join Executive Editor Greg Kasavin, Senior Editor Jeff Gerstmann, Features Editor Bob Colayco, and Features Producer Rich Gallup as they discuss the Hot Coffee brouhaha, the ups and downs of gaming stocks, inflation in the land of Azeroth, and more!", a creation date and, importantly, an identifier that identifies the location of the media file for the episode, in this case by a URL to the MP3 file "hotspot_072005.mp3."

Depending on the specification used, the amount and type of information regarding the feed 152 and its episodes may vary. However, because the specification is declared in the feed 152, all information can be extracted and interpreted appropriately if the interpreter has knowledge of the specification.

Figure 3:
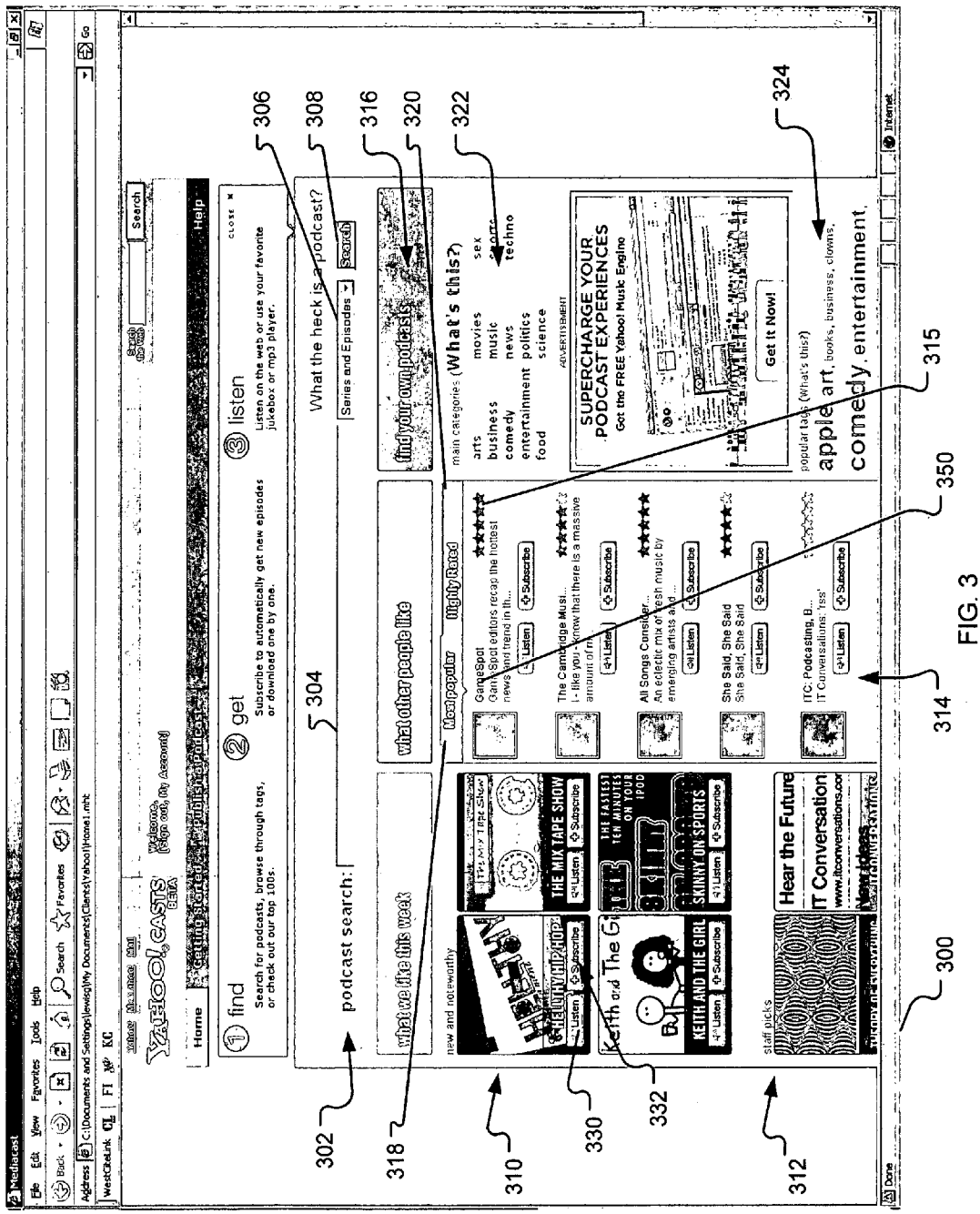
FIG. 3 is an exemplary user interface of an exemplary podcast subscription engine according to one embodiment of the present invention.

FIG. 3 is an exemplary user interface 300 of an exemplary podcast feed search engine as it would be displayed on a browser of a processor 103 according to one embodiment of the present invention. The graphical user interface 300 (GUI) includes several areas within the interface, each containing one or more displayed user interface elements. Examples of user interface elements include non-interactive elements such as text, images and video frames displayed to the user as well as interactive elements such as user controls, for example text boxes, links, scrollbars, icons, and dropdown boxes. In one embodiment, the GUI 300 is the "home" page of the feed search engine 172 that is displayed to processors 103 when the search engine 172 is accessed via a browser on the processor 103.

Figure 4:
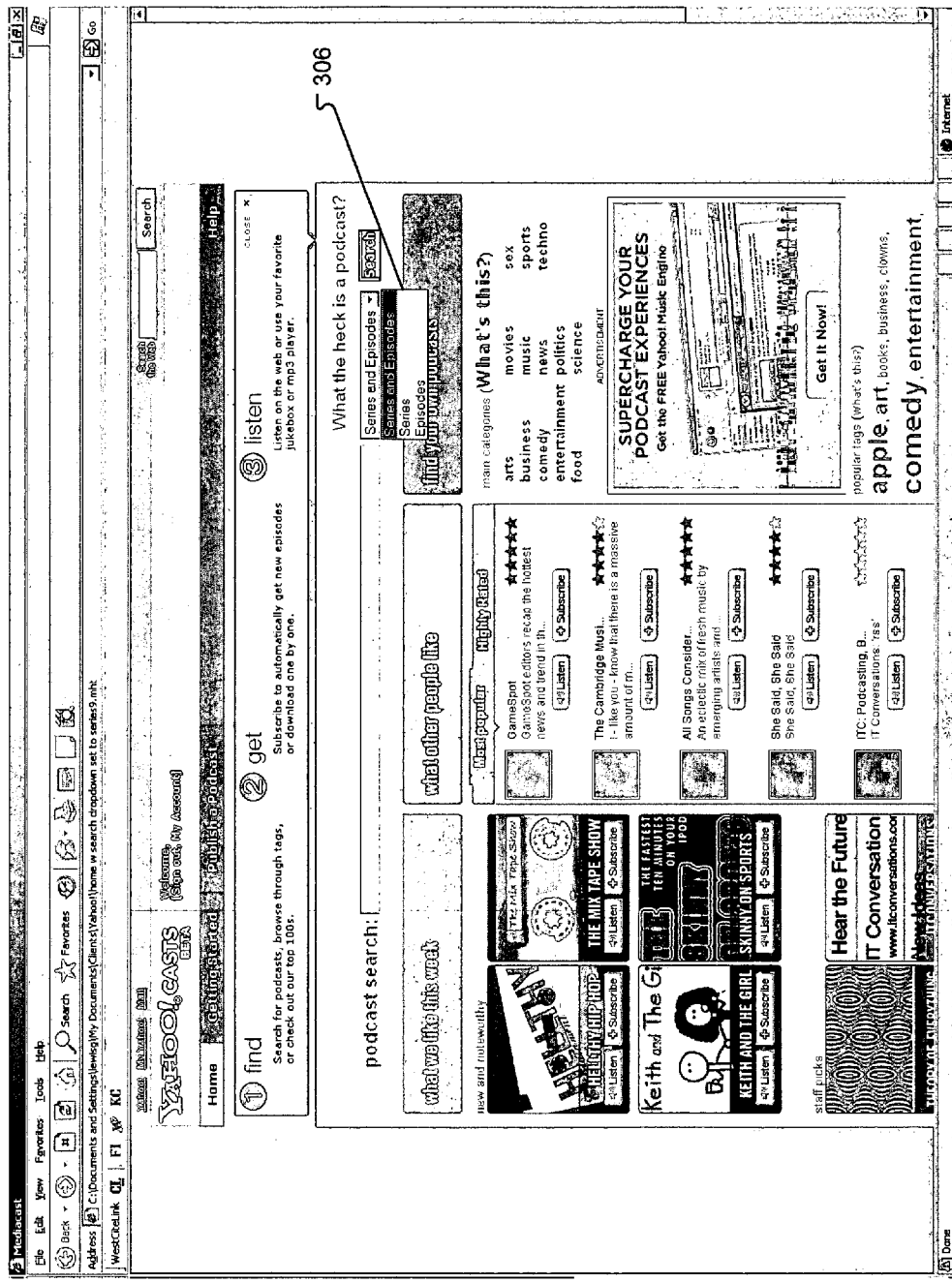
FIG. 4 is an illustration of the drop down box contents in the search area of the user interface of FIG. 3.

One area of the GUI 300 is a podcast search area 302. The search area 302 includes a text field 304 within which the user can enter search criteria for podcasts. The search is initiated by a user command delivered via the "search" button 308. Via the drop down box 306 associated with the search field 304 a search can be limited to searching for only series, searching for only episodes or searching for both series and episodes that match the criteria. FIG. 4 is an illustration of the drop down box 306 contents in the search area of the user interface.

In another embodiment (not shown), a nested search is possible in which a user can search for episodes within a specific series or set of series. For example, the user could direct the search engine to search within a specified series for a keyword or within the set of series that a first criteria for episodes that meet a second criteria. This allows a user to refine the search to limit the size of the results set that the user must consider. The search utility may further allow users to focus a search by searching within a first set of search results.

Another area of the GUI 300 is an area 310 titled "New and Noteworthy". This area displays the image associated with podcasts that the manager of the search engine has determined are new and potentially of interest to the users. In addition, the area 310 displays a listen button 330 and a subscribe button 332. The listen button 330 causes the most recent episode of the identified series to be downloaded to the user's processor 103 and rendered (e.g., displayed if text, or played with the appropriate media player if audio or video content) to the user. In an embodiment, user activation of the listen button 330 results in the execution of a server-based media player that streams the appropriate media file the user's browser for rendering in a specialized podcast user interface. From this media player user interface, discussed in greater detail below with reference to FIG. 14, the user can view information about the episode being played obtained from the feed database and the feed itself as well as control the playback of the media file.

The subscribe button 332 causes the processor 103 to subscribe to the podcast associated with the button 332. In an embodiment, the subscription server transmits data to the processor 103 that is used by the subscription manager 162 to update the subscription file 160. In one embodiment, a file such as a .pcast file (discussed in greater detail with reference to FIG. 18, below) is transmitted that includes the information necessary to effect the subscription in a form that the user's subscription manager can interpret. The .pcast file format is an example of a file type that is associated with and handled by a subscription manager 162. The subscription manager 162 is then called on by the processor to interpret the file. In response the subscription manager 162 interprets the .pcast file and adds the appropriate information to the subscription file 160 on the processor. As discussed above, this causes the subscription manager 162 to periodically check the feed to determine if any new episodes (media files 154) have been added to the feed 152.

In an embodiment all subscriptions made via a subscription button 332 are also recorded on the subscription server 118. For example, the subscription server may update the user's information in the user information database 170. Additionally, the feed database 174 also is updated to indicate that an additional user has subscribed to a feed and may even record the user's identity.

The actual contents displayed in the new and noteworthy area 310 may be determined in part by the user information associated with the user in the user information database. Thus different users may see different podcasts in this area. Another similar area 312 is titled "staff picks" that displays the podcasts recommended by the staff. Both the area 310 titled "New and Noteworthy" and the area 312 is titled "staff picks" are provided under the heading of "what we like this week".

Another area of the GUI 300 is the recommendations area 314 titled "what other people like." This area 314 contains recommended podcasts. The recommendations area 314 has two tabs 318, 320 for showing recommendations by popularity (most subscribed to) or by user reviews of the quality of the podcasts, as indicated by the star rating 315 associated with each podcast. In the embodiment shown, the podcasts are listed by popularity based on the number of subscribers known to the search engine.

The recommendations area 314 displays series information for each listed podcast. For example, the first podcast listed in the area 314 is the GameSpot podcast that is shown in FIG. 2. From the feed, the title and the feed description (both shortened to fit the display area) are provided. In addition, an image may also be provided. The listen button 330 and subscribe button is also provided for each podcast. Each podcast listing also includes a rating element 315. In the embodiment shown, the title 350 is also hyperlink that delivers to the user a page specific to the series and containing more detailed information about the series (See FIG. 10).

Another area of the GUI 300 is an area 316 titled "find your own podcasts." This area includes two sub areas and an advertisement. The first sub area is a list 322 of main categories. In this list 322, a standard set of categories are presented which are associated with one or more podcasts. In an embodiment of the present invention, the categories are tags, as previously described, that are associated with podcasts in the feed database 174.

The second sub area 324 is titled "popular tags" and it displays a list of tags. While the main category may be a fixed list of standard categories like "arts," "business," and "entertainment," the popular tags area 324 is intended to be dynamic and display user created tags that are popular or specifically relevant to the particular user at the time the GUI 300 is generated. In addition, the tags are displayed in a what that more popular tags are displayed larger than less popular tags. Thus the user can see at a glance the relative number of podcasts associated with a particular tag.

The GUI 300 allows the user to subscribe to a displayed feed (via a subscribe button), listen to an episode of a displayed feed (via listen button), and obtain the complete information on the feed (via clicking on the hyperlinked title) from the same interface 300. A user need not know where the feed resides on the Internet. Furthermore, the user does not need to access the publishers site to subscribe, listen or obtain additional information on a feed.

Figure 5:
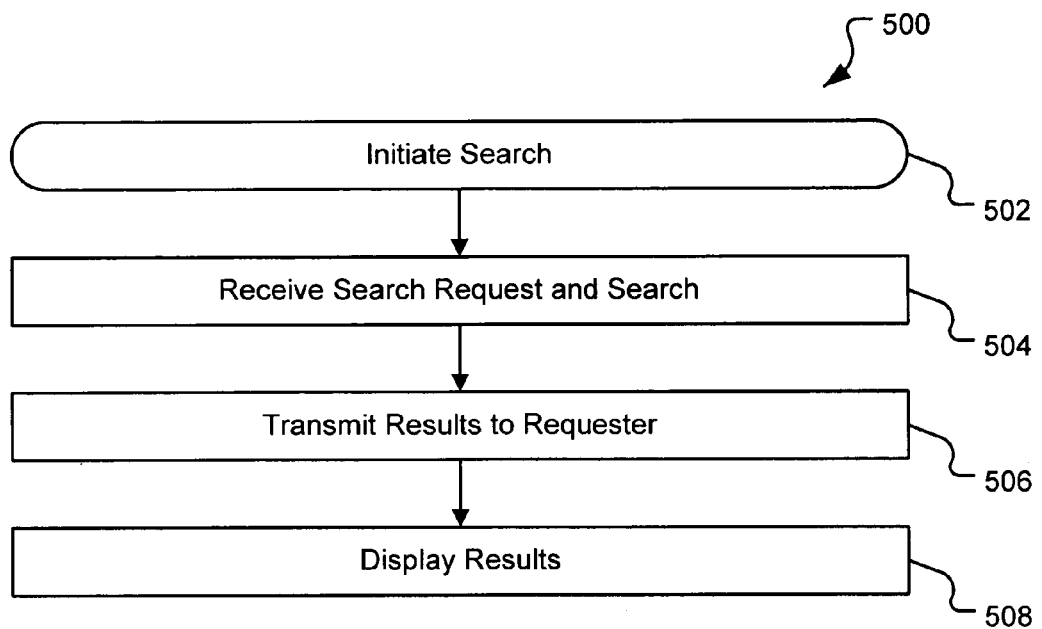
FIG. 5 is a flowchart depicting an embodiment of a method for searching for podcasts in accordance with the present invention.

FIG. 5 is a flowchart depicting an embodiment of a method for searching for podcasts in accordance with the present invention. The method starts with a user initiating a search in an initiation operation 502. In an embodiment, the initiation operation 502 includes a user entering one or more keywords in the text box 304 as a criteria, selecting a search from the drop down box 306 and hitting the search button 308. This operation 502 then transmits the search criteria in a request to the feed search engine 172 on the subscription server 118.

The feed search engine receives the request and performs a search in a search operation 504 as directed by the user. If, for example, the user directed the search engine to search only for series matching the criteria, then the results displayed to the user will be limited to series matching the criteria even though the search may not necessarily be so limited.

The search operation 504 may include searching for podcasts containing the search criteria in their title and descriptions and/or in the title and descriptions of the episodes. Any textual information available, such as that provided in the feed 152 can be searched for matches to the criteria. The search may involve actively searching the Internet for available podcasts matching the criteria at the time the search is received by the subscription server.

In an embodiment of the present invention, the search also involves searching the feed database 174 maintained by the subscription server 118. If the search criteria happens to be a tag or contained in a review associated with a series or episode, then the series or episode is also considered a match to the search criteria. In this way, a search on a specific term may returned a podcast series tagged with that term, even though the term is not associated with the podcast by the podcast's publisher. Furthermore, as will be described in greater detail below, since tags and reviews are created by users of the search engine, new tags or reviews may be created at any time to augment the searchable information available for a series or episode.

For example, a news podcast that contains an interview with Bruce Lee may not include in its description the name of Bruce Lee's martial art, Jet Kune Do. As publishers are limited by their chosen feed specification in how much information they can provide with a feed or associated with an episode, such ancillary information may not be deemed important enough to provide in the feed. A user of the feed search engine, then, can create a tag "Jet Kune Do" and associate it with the podcast (via the search engine GUI which stores the tag in the feed database and associates it with feed) allowing other users of the search engine interested in Jet Kune Do to find the tagged feed or episode easily. This will be described in greater detail below.

After the search operation 504 is performed, the results are transmitted to the user in a transmit results operation 506. In an embodiment, the results are transmitted in the form of a page, such as an .HTML or .XML webpage, containing a search results GUI. The page is generated by the search engine and populated with the results of the search. The results may be displayed based some criteria such as the average rating or number of reviews. Thus, the contents of the feed database may affect how the search results are displayed as well as what search results are returned. The user's processor 103 receives the results and displays them to the user in a display operation 508.

Figure 6:
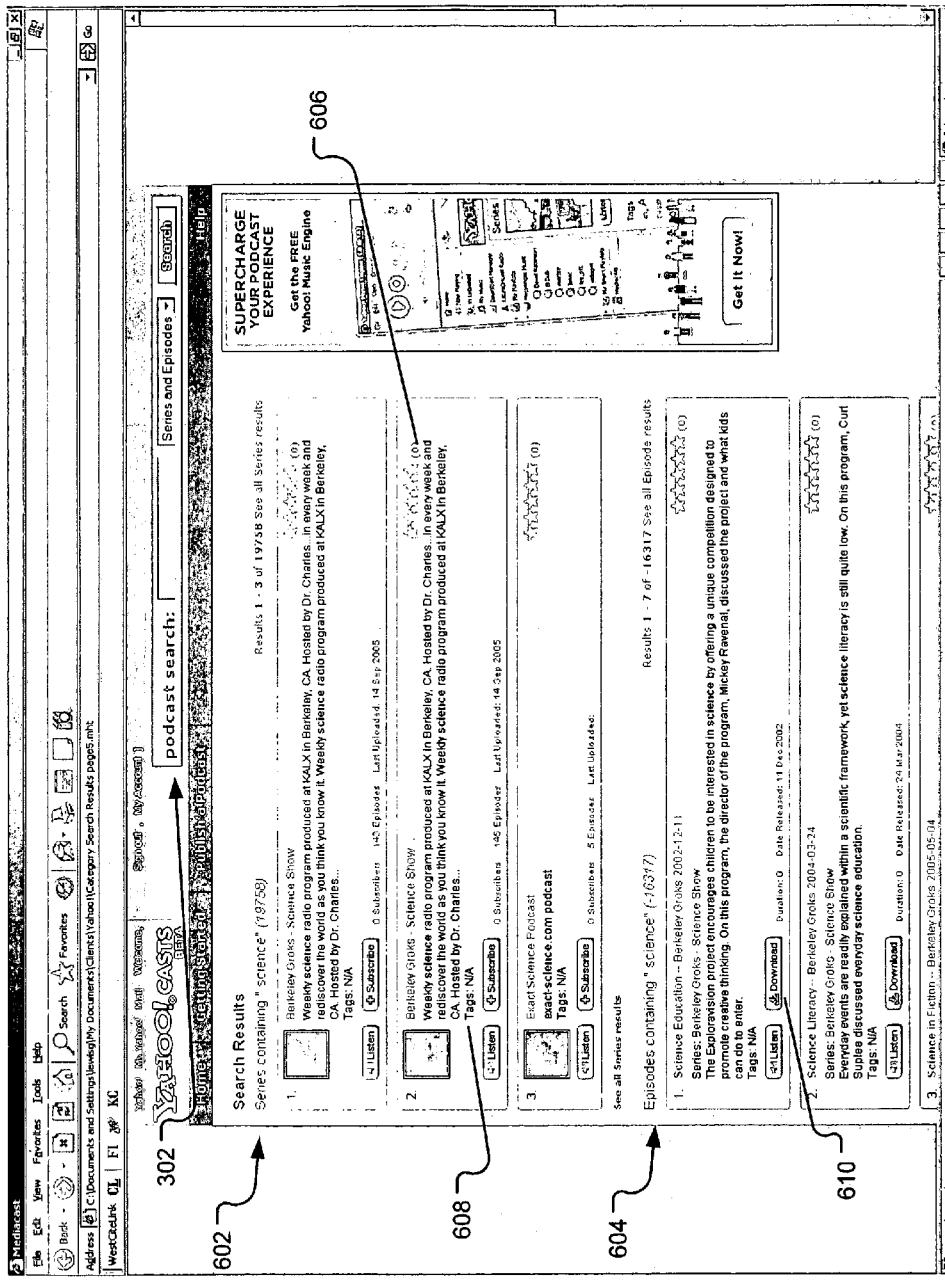
FIG. 6 is an exemplary user interface showing the results of a podcast search according to one embodiment of the present invention.

FIG. 6 is an exemplary user interface 600 showing the results of a podcast search according to an embodiment of the present invention. FIG. 6 shows the results for a search of both series and episodes for the word "science" displayed on a search results GUI 600. In the search results GUI 600 is divided into several areas including a search area 302 at the top of the GUI 600.

One area 602 shows the series that were returned as matching the search term "science." In the GUI 600, the term "science" is shown in bold face to assist the user in identifying where the term was found.

The series results area 602 provides for each series listed the series title, description and image from the feed. In addition, a rating for each series as previously described is provided from the feed database. In addition to the rating "stars", the rating also include a number of users display 606 that have rated the podcast to give the user additional information about the potential quality of the podcast. Listen and subscribe buttons are also provided allowing the user to listen to or subscribe to any listed series with a single command. An additional element in the listing 602 is a tag display 608 listing the tags that users have associated with the series. The tags are obtained from the feed database 174.

A user interface element is provided on the GUI 600 allowing the user to "view all series results." Likewise another user interface element is provided on the GUI 600 allowing the user to "view all episode results."

The episode results area 604 includes substantially the corresponding information for episodes as shown in the series results area 602. The episode results area 602 provides for each episode listed the episode title, the series title, and the episode description. In addition, a rating for each episode as previously described is provided from the feed database. In the embodiment shown, none of the episodes have been rated so no stars are filled in. In addition to the rating "stars", the rating also include a number of users display 606 indicating the number of users that have rated the episode to give additional information about the potential quality of the episode's or feed's rating. Listen buttons and download buttons 610 are also provided allowing the user to listen to or download to any listed episode with a single command. An additional element in the listing 602 is a tag display 608 listing the tags that users have associated with the individual episode. The tags are obtained from the feed database 174 information associated with the episode.

In the embodiment, series titles and episode titles are user interface elements in the form of links that, when selected by a user such as via a mouse click on the link, open a series description page or an episode description page. These description pages include additional and more detailed information regarding the associated feed or episode. An example of a series description page is provided with reference to FIG. 10 and an example of an episode description page is provided with reference to FIG. 11, below.

Figure 7:
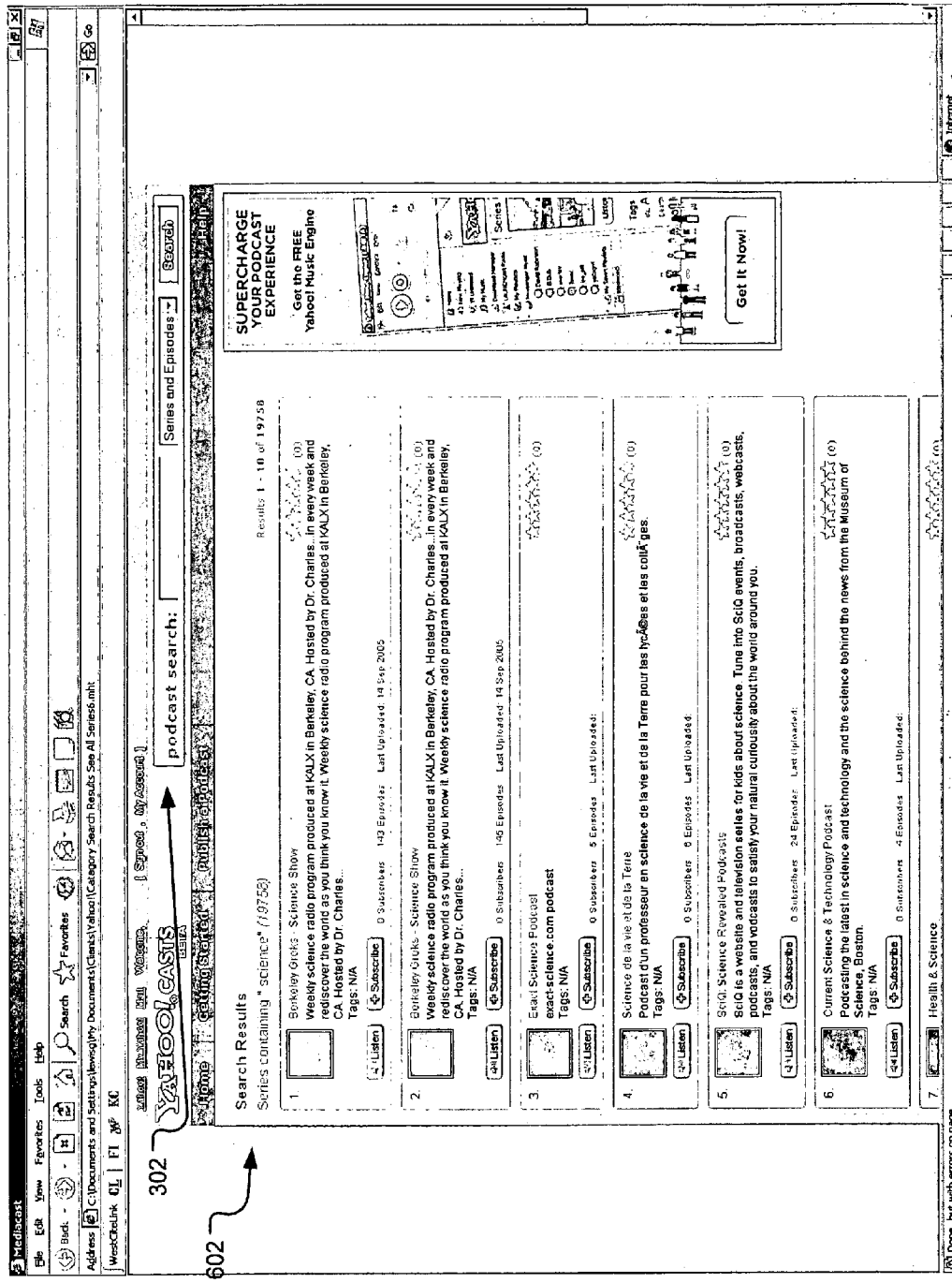
FIG. 7 is an exemplary user interface showing the results of a podcast search limited to series according to one embodiment of the present invention.

FIG. 7 is an exemplary user interface 700 showing the results of a podcast search limited to series according to one embodiment of the present invention. Again the GUI 700 is divided into several areas including a search area 302 at the top of the GUI 700 and a series search results area 602. The search results are displayed essentially as described above with reference to the series search results area 602 described with reference to FIG. 6; the main difference being that more results are shown.

Figure 8:
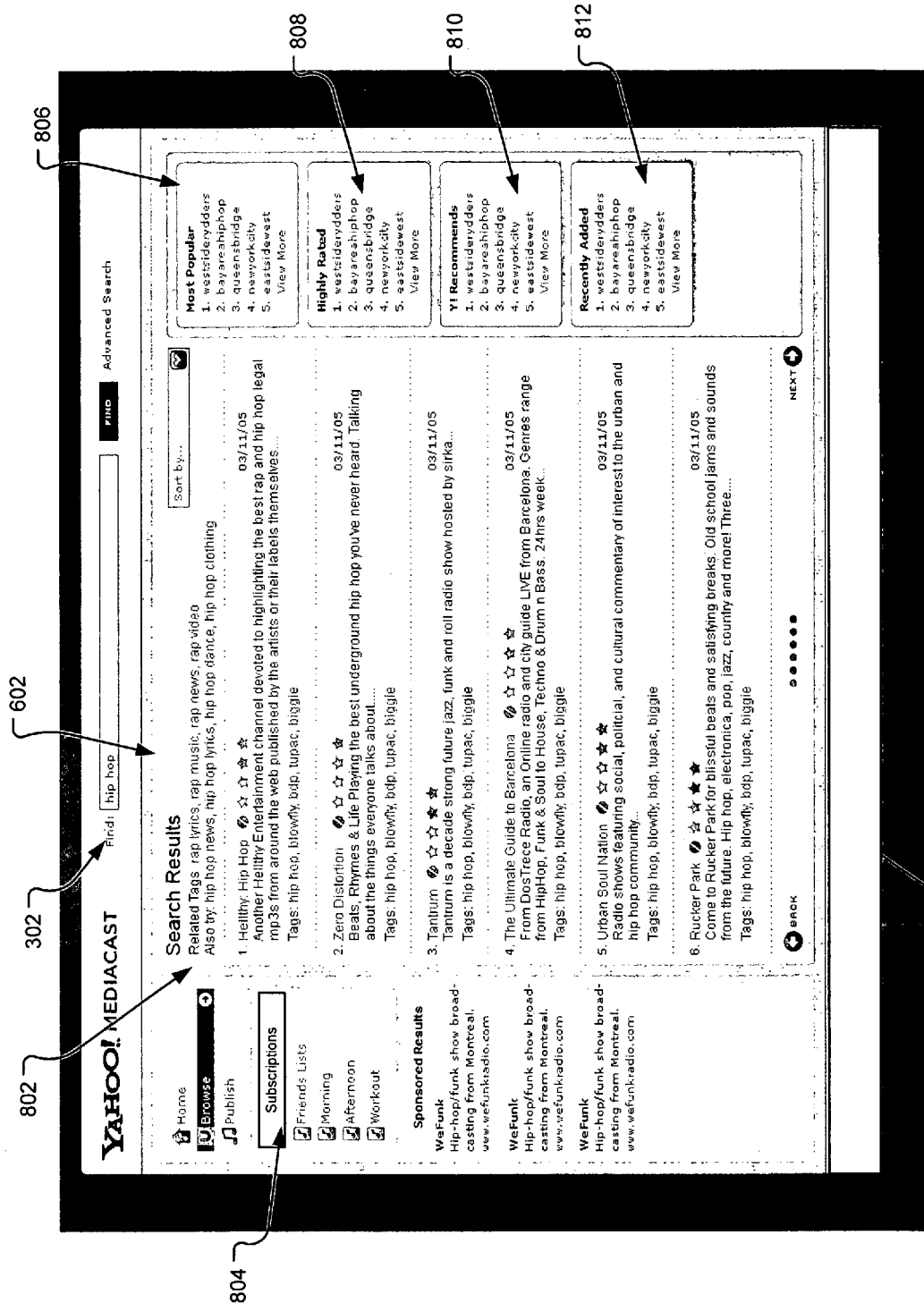
FIG. 8 is an alternative exemplary user interface 800 showing the results of a podcast search limited to series according to one embodiment of the present invention.

FIG. 8 is an alternative exemplary user interface 800 showing the results of a podcast search limited to series according to one embodiment of the present invention. The user interface 800 is a GUI 800 that is divided into several areas including a search area 302 at the top of the GUI 800 and a search results area 602. In addition, the GUI 800 includes a related tags area 802 that shows tags that are similar to the search criteria used to generate the results shown.

In the embodiment shown, for example, a search was done on "hip hop" which may or may not be a pre-existing tag in the feed database 174. The related tags area 802 displays other tags including "rap lyrics," "rap video," etc. These related tags are generated by comparing the results associated with the search term "hip hop" and the relative prevalence of other tags associated with those results. Tags other than the search criteria that are associated with most or every one of the results may be identified as related tags. In one embodiment, a threshold such as 90% is chosen and if a search returns results in which 90% or more of the identified series and episodes are associated with a pre-existing tag, that tag will be shown as a related tag. Additional tags that do not meet the threshold criteria for a related tag may be displayed in an "also try" group. This group may use a lower threshold or may be based on how well the criteria matches to other tags. In the embodiment shown, while "hip hop" is not a tag, several tags include the term hip hop and these tags are returned under the heading "also try."

The related tags area 802 of the interface 800 is provided to direct users into more frequently used tags. This assists users whose choice of keywords may be eclectic or outside of the mainstream. Such a related tag identification system is necessary when not using pre-defined categories. In pre-defined categories, the user has no choice but to either word search the available data provided by the publisher or rely on the categorization system set up by the manager of the search engine. A embodiment of an adaptive searching method using tags is discussed with reference to FIG. 9 below.

The interface 800 also includes a subscriptions area 804. This area contains a list of all podcasts currently subscribed to by the processor 103 that is in contact with the subscription server 118. The subscriptions may be categorized by the user as shown or simply provided in a list.

The interface 800 also includes a most popular area 806 display the feeds that currently have the most subscribers. A most highly rated area 808 is provided showing the five most highly rated feeds based on consumer-generated ratings. A recommendations area 810 is provided that makes recommendations to the user based on the users past subscriptions and other information concerning the user containing the user information database. A recently added area 812 is also provided that shows five podcasts that have been recently published. The five recently added may be selected based on their rating, if any, and when they were first published and found by the search engine as wells as how they compare to the existing user information.

Figure 9:
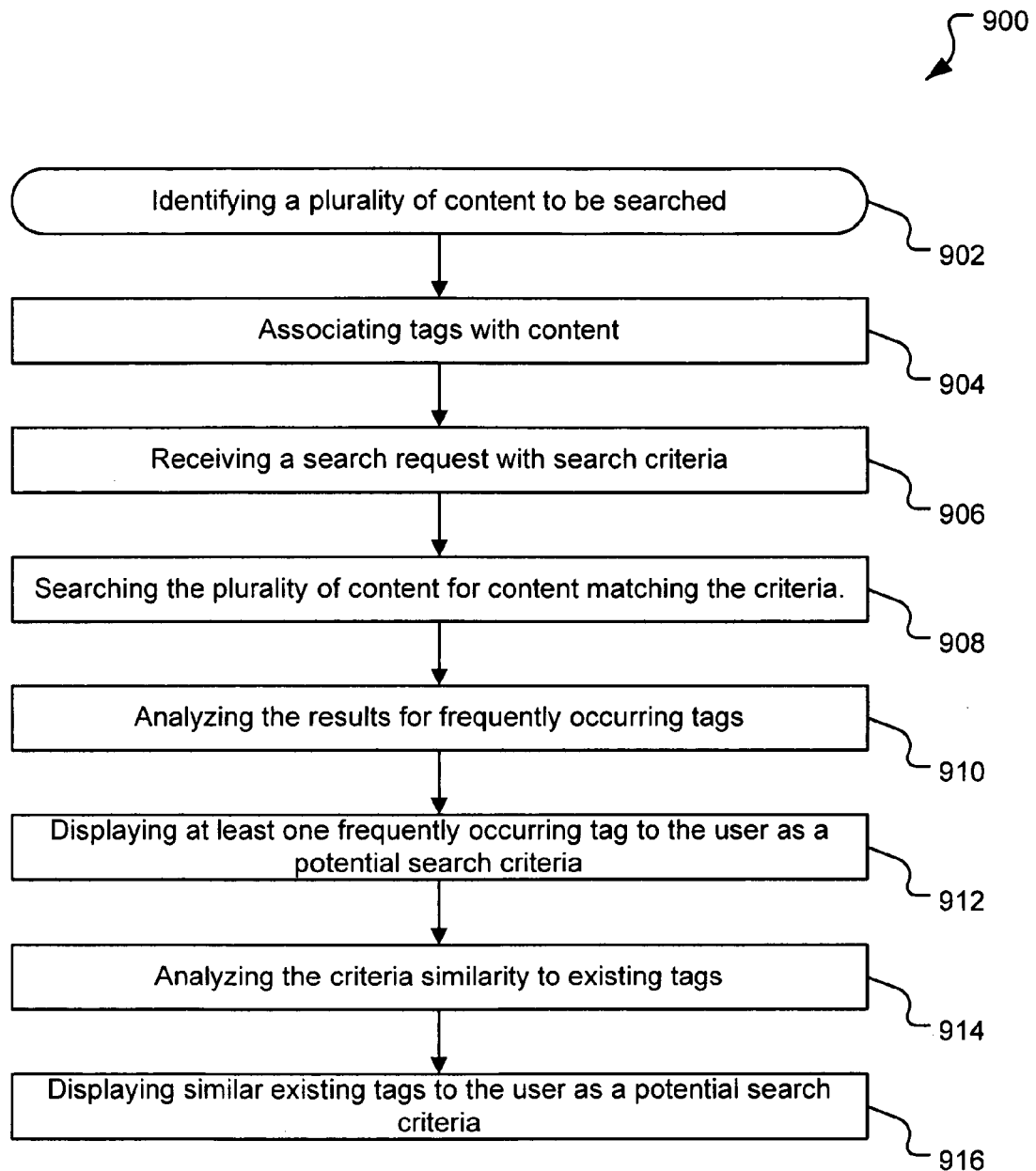
FIG. 9 is an embodiment of a method of using tags for generating an adaptive search utility in accordance with an embodiment of the present invention.

FIG. 9 is an embodiment of a method of using tags for generating an adaptive search utility in accordance with an embodiment of the present invention. The method 900 begins by identifying a plurality of content to be searched in an identification operation 902. In an embodiment of the present invention, the content are feeds that can be subscribed to and that the feed search engine will search when requested by the user and information concerning the identified content is stored in a feed database.

An associating operation 904 then associates with each piece of content one or more tags. In one embodiment, the tags are created by users who have reviewed the content and have directed the search engine to associate the content with this tag. In another embodiment, the tags are created by the publisher of the content. In yet another embodiment, the tags are created by the search engine manager. In yet another embodiment, the tags are created by any combination of the aforementioned parties and tags from different sources are be visibly distinguished on a display identified by different colors, locations, or fonts on a graphical user interface. In an embodiment, the tags and associated content information are stored in a feed database for use during future searches.

In an embodiment, the associating operation 904 includes maintaining a information regarding how many users have tagged each piece of content with a given tag. This is number then used to weight the tag and its descriptiveness of the content.

In a receive search request operation 906, the search engine receives a request from a user to search for content matching some criteria. The criteria may be a keyword or set of keywords. The criteria may also limit the search to specific types of content with the spectrum pieces of content identified in the identification operation 902. The criteria need not be a pre-existing tag and can be any keyword or combination of symbols entered by the user.

A search operation 908 is then performed. The search operation 908 may include performing a new search of content, may include a search a database built when performing the initial identification operation 902 or may include a combination of searches including. The search operation 908 may include updating information in the feed database. The criteria provided by the user are used to identify pieces of content that match the search. The information provided by the content publishers may be searched as may be any additional descriptive information, such as reviews and tags, subsequently created by third parties and associated with the content in the feed database. The results of the search is a set of content that match the criteria. Such search results may be transmitted back to the user for display as part of the search operation 908. If so, the search results may be displayed in some order based on criteria such as the average rating, recent popularity, or number of reviews, e.g., most highly rated content being displayed first. Thus, the ratings and reviews in the feed database may be used to refine how the search results are displayed as well as to determine what search results are returned.

Next a first analysis operation 910 identifies any frequently occurring tags that are associated with the content in the search results set. Tags that are frequently associated with the same piece of content may be weighted more than tags that are associated only once. For example, a weighted score for each tag associated with the content in the search results set may be generated. The weighted score may be based on the number of pieces of content a tag is associated with compared to the total number of pieces of content and may also be based on the number of times a tag has been associated with each piece of content. The weighted score for each tag may then be compared to a pre-determined threshold normalized to the search results and tags with weighted scores in excess of the threshold are selected. Alternatively, one or more of the tags most frequently associated with the content in the search results may be selected. The first analysis operation 910, one or more tags are selected as related tags to the search result set.

A first display operation 912 then displays the related tags to the user who submitted the search and notifies the user that the related tags may, when used as search criteria, provide better search results than the criteria originally chosen.

A second analysis operation 914 may also be performed. In the second analysis operation the search criteria is compared to existing tags in the feed database. Based on the comparison one or more tags may be selected as also try tags that potentially may provide better search results to the user. Again the comparison may be based on the relative number of times the tags have been associated with content in the feed database, both in terms of number of pieces of content each tag has been associated with and overall number of times each tag has been associated with specific pieces of content. The second analysis operation 914 is followed by a second display operation 916 that displays the to the user who submitted the search and notifies the user that the related tags may, when used as search criteria, provide better search results than the criteria originally chosen.

In an alternative embodiment, the second analysis operation 914 may also select one or more tags, based on the search results, to display to the user that would allow the user to focus the search. Such focus tags may be selected based on the number of times the tags are associated with items in the search results, the user's search profile and user information, and currently popular tags. In addition, the number of focus tags selected and displayed may be a function of the size of the search results from the original search. The focus tags then may be considered a drill down analysis into the original search results using tags as the criteria.

Figure 10:
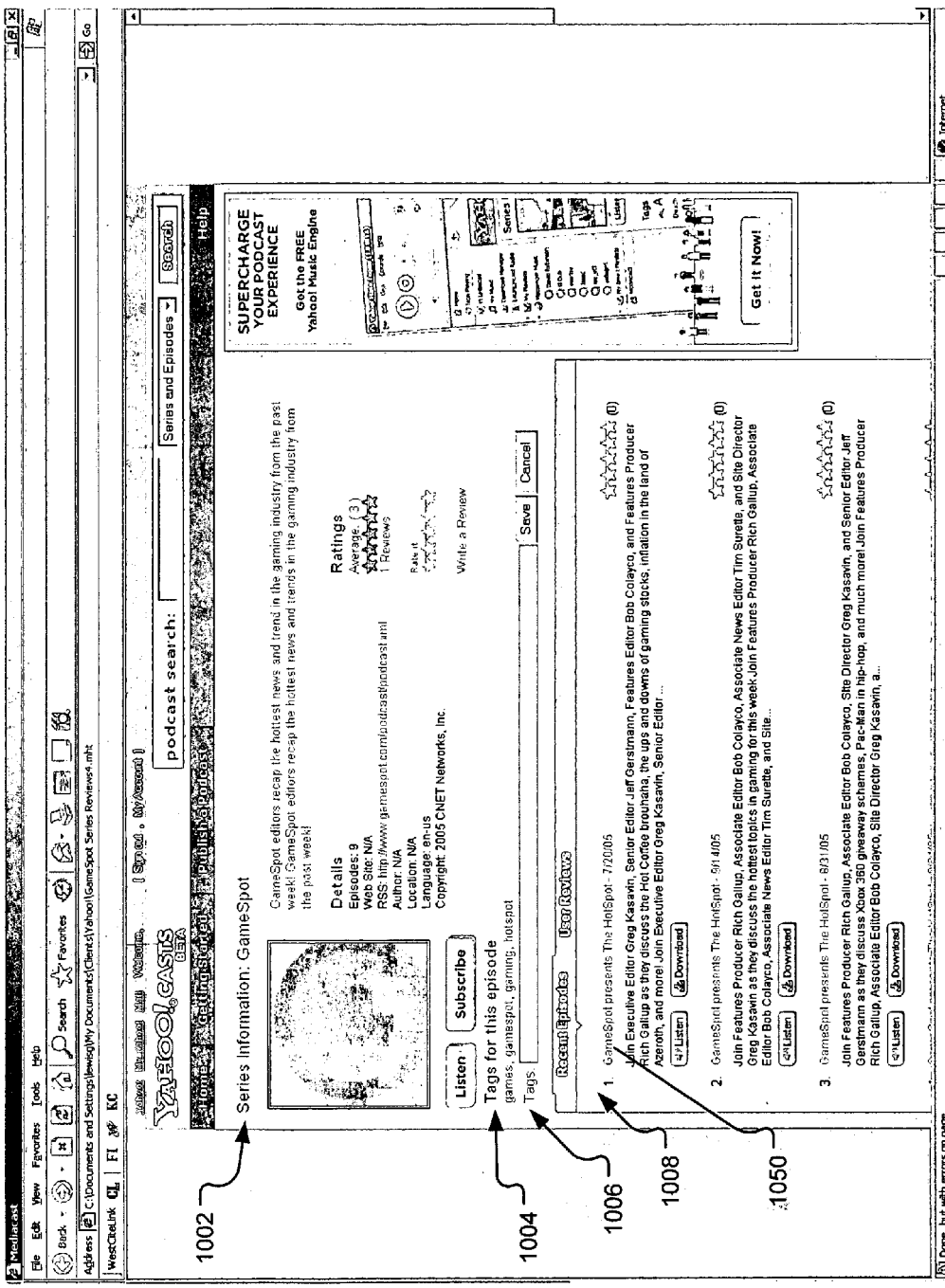
FIG. 10 is an exemplary user interface showing detailed information on a series according to one embodiment of the present invention.

FIG. 10 is an exemplary user interface showing detailed information on a series according to one embodiment of the present invention. FIG. 10 is a series information GUI 1000 that appears when a user drills down to obtain series information, such as by clicking on the hyperlink 350 in FIG. 3.

The series information GUI 1000 has several areas. One area is a series information area 1002. The series information area 1002 provides the series title, description and image from the feed. In addition, a rating for each series as previously described is provided from the feed database. In addition to the rating "stars", the rating also includes a number of reviews for the series, which may be link to the reviews themselves. An average rating may also be provided, if the rating shown is not an average of user ratings, but some other metric such as a median or weighted average. The user may also be shown a link that allows the user to write a review of the series. Listen and subscribe buttons are also provided allowing the user to listen to or subscribe to the series with a single command, in this case a mouse click. The series information area 1002 also provides more detailed information such as the number of episodes in the series, the web site for the series, the URL of the actual feed file for the series, the author, the location, the language, and the copyright information for the feed. This information may have been obtained from the feed itself, or provided by the publisher of the feed separately to the search engine manager.

An additional element in the series information area 1002 is a tag display 1004 listing the tags that previous consumers of the series have associated with the series. The tags are obtained from the feed database 174. In the embodiment shown, below the tag display 1004 is a tag entry area 1006 including a text box and a save button for saving a tag to be associated with the series. This tag entry area 1006 is a GUI element that allows a user to enter information into the feed database as described with reference to FIG. 12 below.

In addition to the series information area 1002, the GUI 1000 includes a second area that can display either recent episode information or user reviews depending on which of two tabs are selected. In the embodiment shown, the recent episode tab is selected and an episode information area 1008 is displayed. The episode information area 1008 contains a for each episode listed the episode title, description and image from the feed. In addition, a rating for each episode as previously described is provided from the feed database. In addition to the rating "stars", the rating also include a number of users display that have rated the episode to give the user additional information about the potential quality of the episode. Listen buttons and download buttons as described above are also provided allowing the user to listen to or download to any listed episode with a single command. In an embodiment, the title of the episode may be a hyperlink 1050 that causes an episode information page to be displayed such as that one described with reference to FIG. 11.

Selecting the user review tab will display a user review listing (not shown). The user review listing displays at least some of the text of various user reviews, the identity of the reviewer, and the rating the user gave the episode all of which may be retrieved from storage in one or more of the databases accessible to the search engine. Additional information may also be provided such as how many podcasts the reviewer has reviewed, a link to additional information about the reviewer, a link to the reviewers full review, and how other reviewers rate the reviewer.

In an embodiment, the consumer can submit tags for the content for the purpose of describing the content to others, for the user's own future use, or to opine on the accuracy of currently used tags as descriptors of the content. This provides a mechanism for the tags to evolve over time as the consuming public's tastes or norms in the use of language changes. It also allows the search engine to accept new tags that are entering the consuming public's lexicon and quickly incorporate the new tags into the search engine. Thus, new tags can be associated with old feeds and the new tags can be used to find such feeds. Furthermore, the use of a second analysis operation 914 allows the new tags to be correlated with the old tags so that the tagging information is not lost as tags evolve over time.

For example, when a podcast related to Jethro Tull is initially introduced a tag "heavy metal" may be used by many consumers to describe the content and the band Jethro Tull. However, as musical tastes change, the tag "heavy metal" may no longer be used by the consuming public to describe Jethro Tull and a tag of "folk rock" may become the best descriptor of the podcast. This evolution would prevent Jethro Tull from becoming confused with bands currently associated with the tag "heavy metal" such as Metallica.

Figure 11:
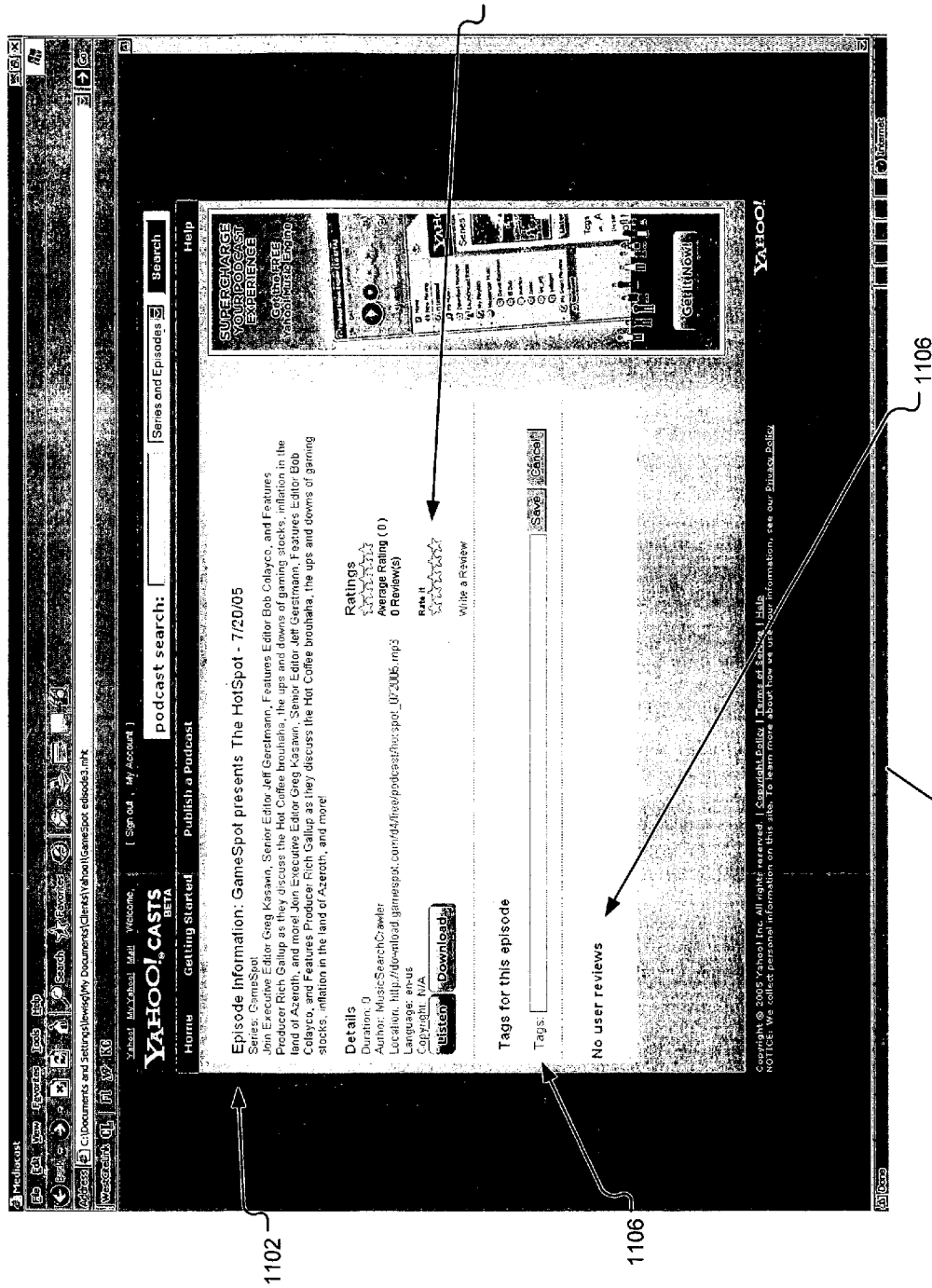
FIG. 11 is an exemplary user interface showing detailed information on an episode according to one embodiment of the present invention.

FIG. 11 is an exemplary user interface showing detailed information on a episode according to one embodiment of the present invention. FIG. 11 is an episode information GUI 1100 that appears when a user drills down to obtain detailed episode information, such as by clicking on a hyperlinked title 1050 in FIG. 10.

The episode information GUI 1100 has several areas. One area is a episode information area 1102. The episode information area 1002 provides the episode title, the series the episode is a part of, and the episode's description obtained from the feed 152. In addition, a rating for each episode as previously described is provided from the feed database. In addition to the rating "stars", the rating also includes a number of users that have rated the episode and an average rating of the episode. Listen and download buttons are also provided allowing the user to listen to or download the episode with a single command, in this case a mouse click. The episode information area 1102 also may include such details as the duration, the author, the location of the media file 154, the language, and the copyright owner of the episode.

Several different user review interface elements may be provided. In the episode information area 1102 as shown, there is a rate it interface element 1104 as well as a link to allow the user to write a review.

The episode information GUI 1100 also includes a review area 1106. In the embodiment shown, there are no reviews of the subject episode. If there were, these would be displayed here and the review listing displays at least some of the text of various user reviews, the identity of the reviewer, and the rating the user gave the episode. Additional information may also be provided such as how many podcasts the reviewer has reviewed, a link to additional information about the reviewer, a link to the reviewers full review, and how other reviewers rate the reviewer.

The episode information area 1102 may also be provided with a tag display such as described above with reference to the series information GUI 1000. The tag display listing the tags that previous consumers of the episode have associated with the episode. The tags are obtained from the feed database 174. In the embodiment shown, below the tag display is a tag entry area 1108 including a text box and a save button for saving a tag to be associated with the episode. This tag entry area 1108 is a GUI element that allows a user to enter information into the feed database as described with reference to FIG. 12 below.

Figure 12:
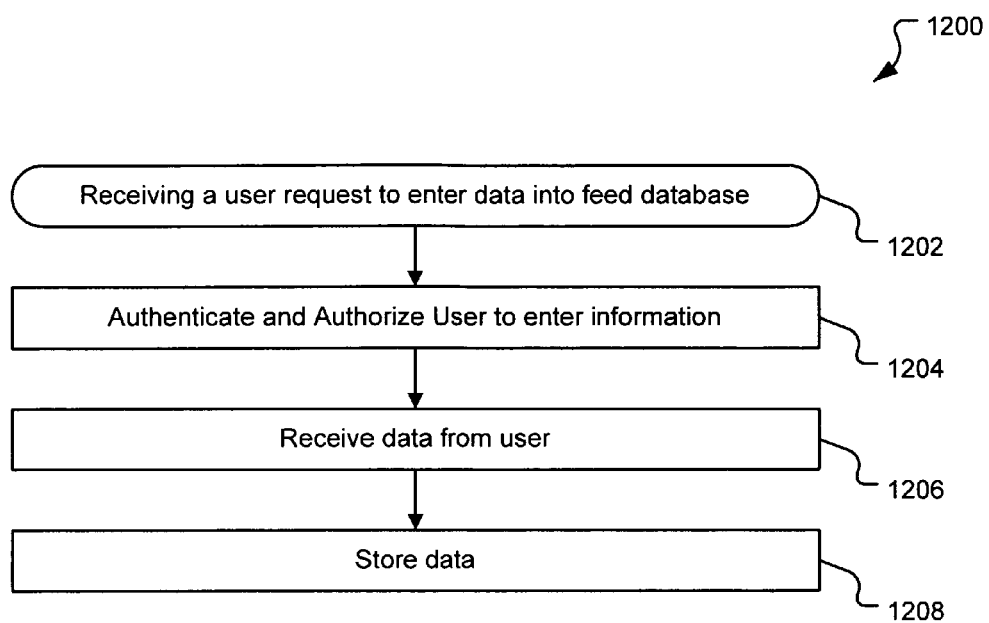
FIG. 12 is a flowchart depicting a process of entering data into the feed database according to one embodiment of the present invention.

FIG. 12 is a flowchart depicting a user's process of entering data into the feed database according to one embodiment of the present invention. The method 1200 starts with a user request to enter information in a request operation 1202. The request may generated by a user entering a tag in a tag entry area such as those in FIGS. 10 and 11, or through a submit a review interface.

Figure 13:
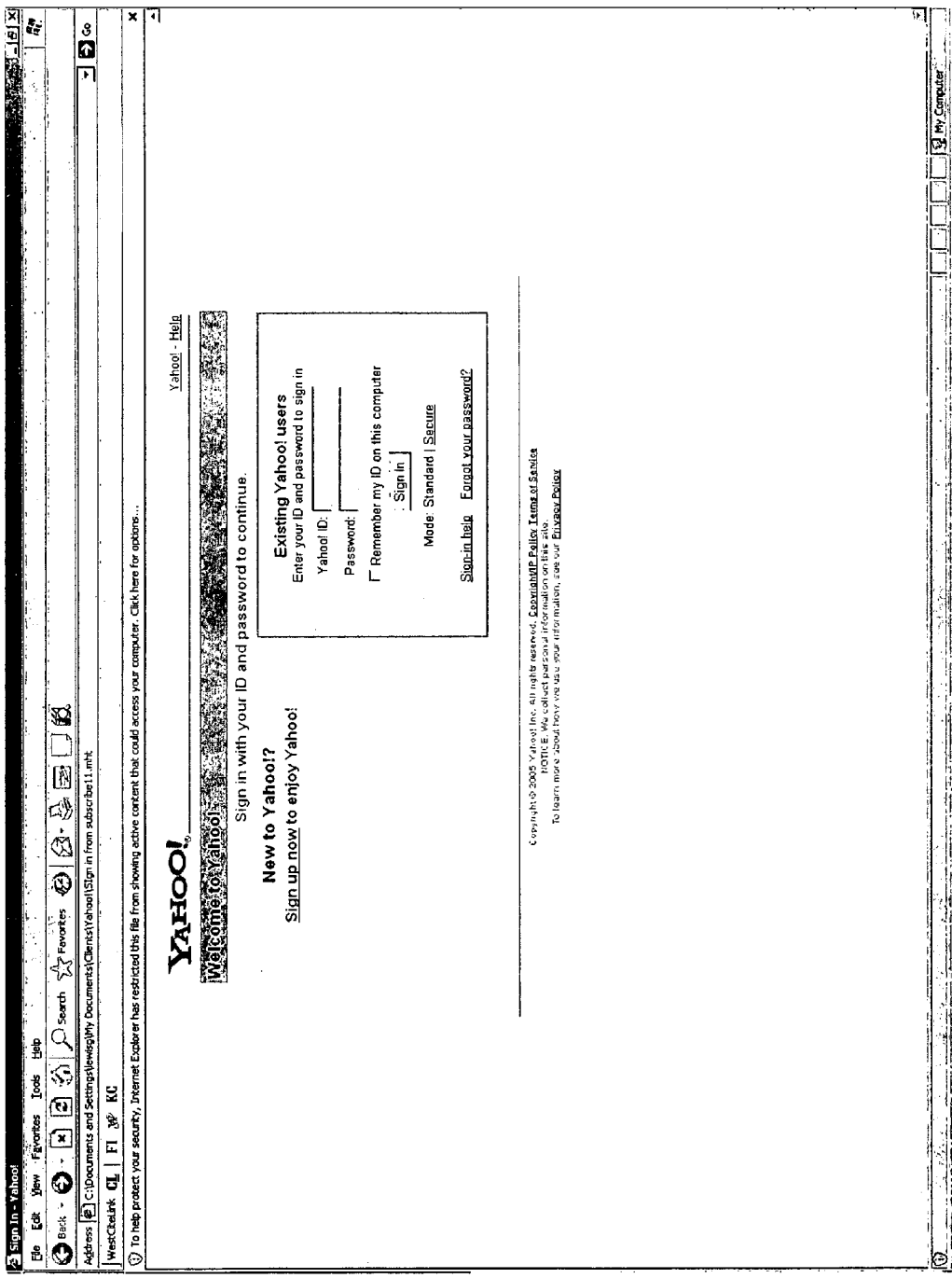
FIG. 13 is an exemplary user interface showing a log in screen according to one embodiment of the present invention.

Next, an authentication and authorization operation 1204 is performed. In this operation 1204 the user is identified or must identify itself to the subscription server 118. In one embodiment, the user must obtain an account, if the user has not already done so, with the subscription server, such as through the user interface 1300 shown in FIG. 13. If the user has already obtained an account or already is known to the server 118, then the can simply log in using whatever manner is required by the system. In an embodiment, the user is required to have an account as a first level of protection to ensure that spurious data is not submitted by users who desire to skew the search results or otherwise corrupt the information in the system for their own reasons.

After the user has been authenticated, the user is then checked to determine if the user is authorized to enter data into the feed database. A user that has abused the system may be barred from entering additional data by the search engine manager. In addition, a user may be barred from writing more than one review of a piece of content or enter more than one rating for a piece of content.

If the user can enter data, a receive data operation 1206 is performed in which the user enters data and transmits it to the search engine. The data is then stored in a store operation 1208 and the relevant entries in the feed database are updated to reflect the new data.

The search engine manager may periodically or at the time the data is entered inspect such data to ensure that the data meets with a minimum standard of entry. For example, the data may be inspected to make sure no obscenities are used.

As mentioned above, one of the purposes of the method 1200 is to prevent corruption of the data and ensure that the data submitted by the users is useful and can improve the search results for future users. Central management of the data, especially the tags, allows for the data to evolve over time without becoming corrupted. Furthermore, if each user is limited in the user's potential individual impact on the data in the feed database, as more users input data the data should eventually come to represent the aggregate user sentiment regarding the content that is associated with the data.

The method 1200 may also be used to allow publishers may submit their podcast and supply a representative set of initial data to associate with the podcast in the feed database. An embodiment of a GUI for publisher submission of data to a feed database is discussed with reference to FIG. 15, below. This gives publishers who opt to use submit their podcasts to the search engine the ability to provide additional marketing and content information directed at the audience of users. Such information may not be transmittable to the users via the feed itself, because of limitations inherent in the feed specification selected. For example, some feed specifications have limits on the description that can be provided for an episode or a series. If the publisher actively submits the feed to the search engine manager, then the publisher may provide additional information. If the published content is has an audio component, such as a interview, then the publisher could submit the text of the audio for association with the content. The entire text of the audio is then available to future users searching for content.

Figure 14:
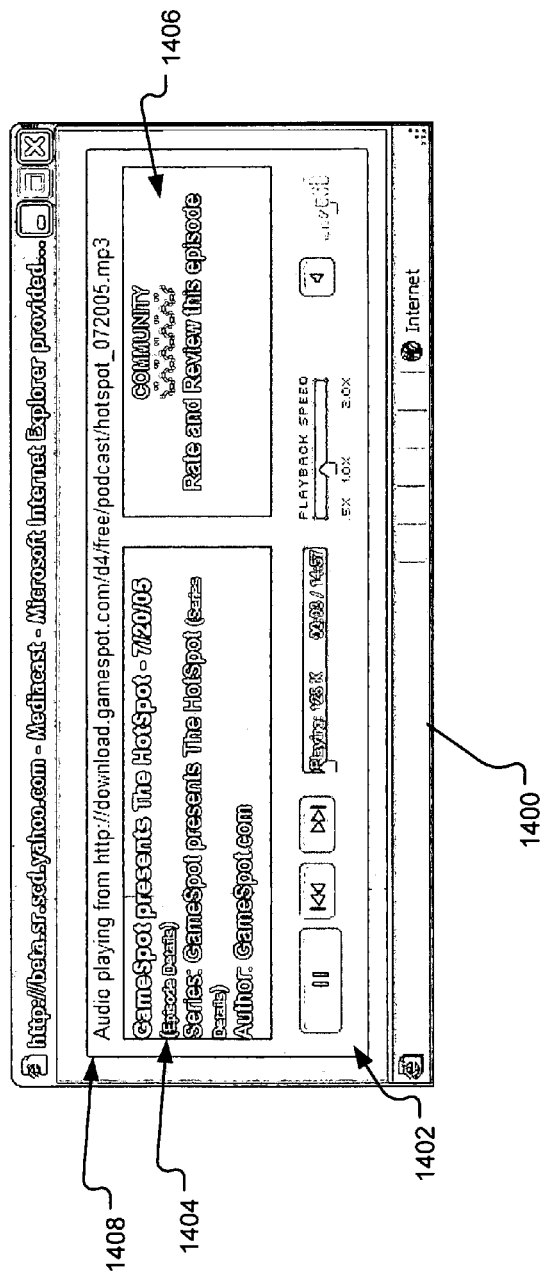
FIG. 14 is an exemplary user interface for a media player that is opened in response to pressing a listen button according to one embodiment of the present invention.

FIG. 14 is an exemplary user interface for a media player that is opened in response to pressing a listen button according to one embodiment of the present invention. In the embodiment, the media player may be a "web player" in that the media player GUI 1400 is generated by the subscription server and transmitted to the user's processor, for example as a page of .HTML or .XML, for rendering to the user via the processor's browser. The media player GUI 1400 may be generated and transmitted in response to a user selection of a listen button associated with an episode or feed on another GUI. The generated media player GUI may then include the location information necessary for the processor to access the associated episode. As part of the rendering, the processor then automatically accesses the episode associated with the listen button, which may include causing the processor to retrieve the episode's media file from a remote server or computing device other than the subscription server that maintains the search engine.

The media player GUI 1400 includes a controls area 1402 containing various media player controls such as a volume control, a mute button, play/pause button, a fast forward button and a reverse button. A slider is also provided to allow the user to play from different locations within the file. A second slider is provided to allow the user to change the speed of the playback.

The media player GUI 1400 also includes an episode information area 1404. The area 1404 includes information such as the title of the episode, the series to which the episode belongs, and the author. Alternate embodiments of media players provide different amounts of information and user interface elements to the user.

In the media player GUI 1400 shown, the GUI 1400 differs from typical media players in that it also includes a data entry area 1406. This area allows the user to enter and submit data to the feed database 174 such as by the method 1200 described with reference to FIG. 12. Thus, a user via the media player 1400 can both listen to an episode and submit data about the episode to the feed database 174.

Figure 15:
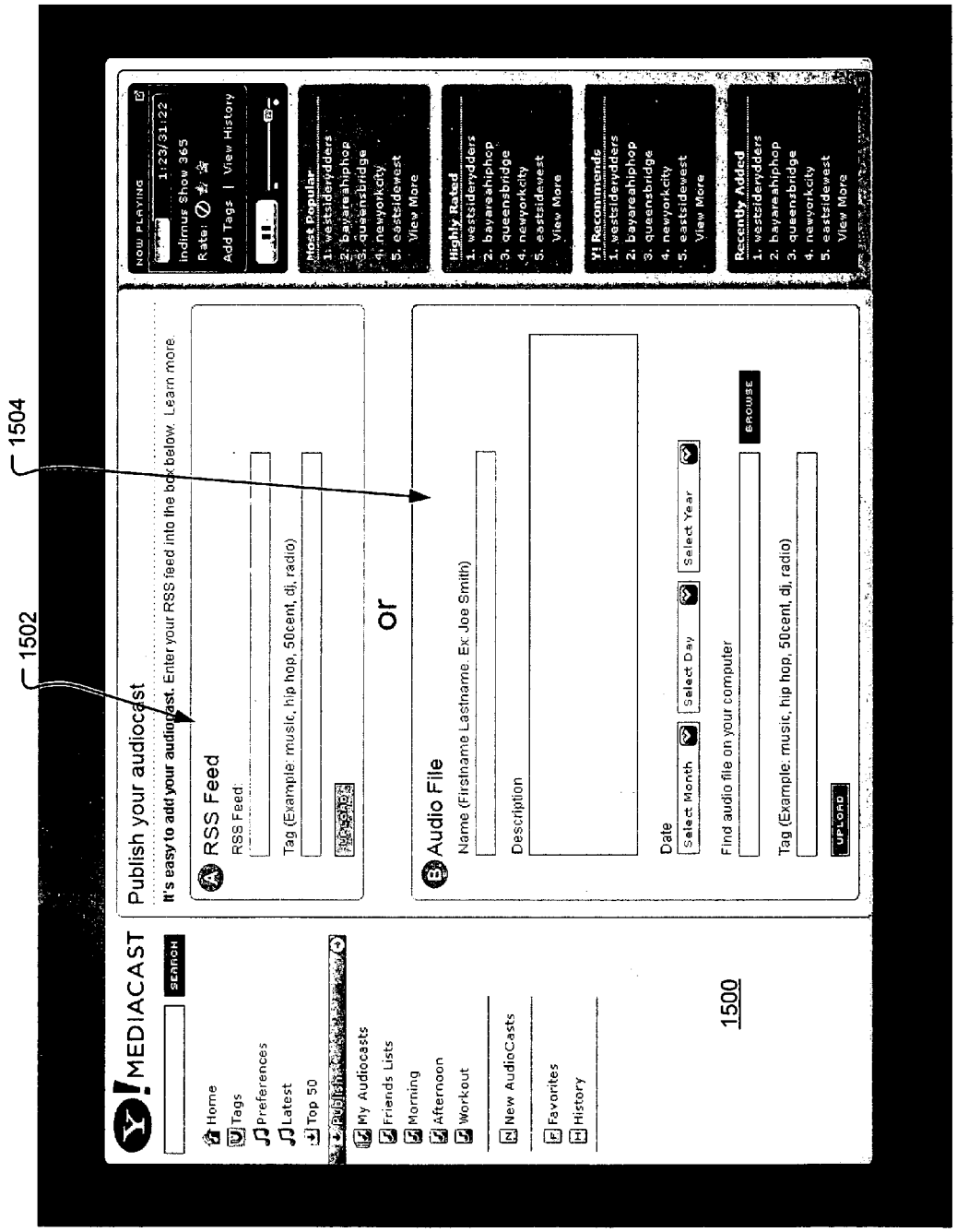
FIG. 15 is an exemplary user interface for publisher submission of a feed to the search engine according to one embodiment of the present invention.

FIG. 15 is an exemplary user interface for publisher submission of a feed to the search engine according to one embodiment of the present invention. The publisher submission GUI 1500 includes several areas previously described with reference to other FIGS. In addition to those areas, the publisher submission GUI 1500 includes an RSS feed submission area 1502. The area 1502 includes a text box for submitting the location of the feed on the network. In an embodiment, a publisher would enter the URL of the feed in the text box. In addition, the area 1502 includes a tag entry field for the publisher to submit tags to be associated with the feed's initial entry in the feed database. Note that the publisher can submit any keyword or character set the publisher wishes as a tag and is not required to select from fixed or pre-defined categories or keywords. An upload button is also provided to submit the entered data to the search engine.

The publisher submission GUI 1500 also includes an media file submission area 1504. In the embodiment shown, only audio files of known types may be submitted but in alternative embodiments any type of file may be submitted. The media file submission area 1504 requires the publisher to enter its name in a text box and provide a description of the media file in a second text box. A set of three drop down boxes is provided for selecting a publication date of the media file. Another text box is provided for locating the media file and associated with this text box is a browse button that will bring up an explorer tool to allow the user to find and select the media file. Finally, a tag entry text box as described above is provided. The media file submission area 1504 is further provided with an upload button that uploads all entered data, possibly including the actual media file, to the feed database.

Figure 16:
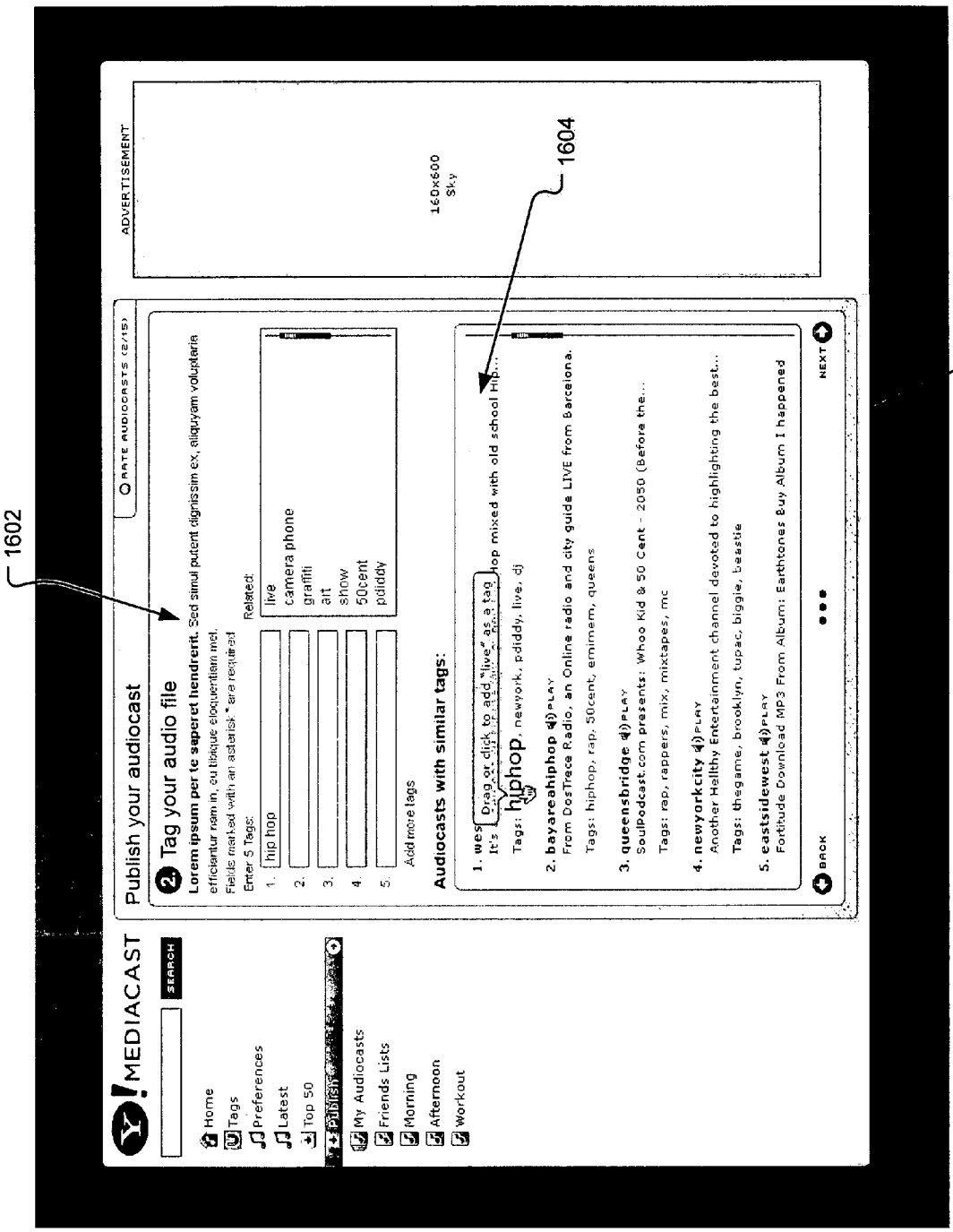
FIG. 16 is another exemplary user interface for publisher submission of a media file to the search engine according to one embodiment of the present invention.

FIG. 16 is another exemplary user interface for publisher submission of a media file to the search engine according to one embodiment of the present invention. The media file submission GUI 1600 is provided with a tag selection area 1602 and a search results area 1604.

The GUI 1600 is presented to a user after the submission of media file information to the search engine, such as via the media file submission area 1504 in FIG. 15. The tag selection area 1602 displays a list of tags entered by the user in the tag entry text box in the media file submission area 1504. The tags submitted by the user are displayed and selectable. Upon selection, a list of related tags (i.e., related to the selected tag) next to the list of submitted tags is shown. This provides the user with additional information for the publisher to consider when selecting tags. Such information is important if the publisher is ultimately limited to submitting a fixed number of tags.

The GUI 1600 is further provided with a search results area 1604. The area 1604 includes a listing of series that are associated with the currently selected submitted tag in the tag selection area 1602. This provides the publisher with additional information to consider when selecting tags for the file he wishes to publish.

FIG. 17 shows the contents of an exemplified file that may be transmitted to a processor and interpreted to subscribe the processor to a podcast in accordance with an embodiment of the present invention. The embodiment shown is a .pcast file as previously discussed above. The file 1800 is written in .XML includes the XML header that identifies the XML specification to be used when interpreting the file. The second line of the file 1800 is a declaration identifying the file as conforming to the ITUNES PCAST specification. The .pcast file then includes the information identifying the feed in the appropriate elements such that the subscription manager 162 can update the subscription file 160. In the embodiment shown, the pcast file identifies one feed (channel element) to subscribe to. The feed can be found at the URL "http://del.i-cio.us/rss/gu.st/log%2Bsystem:media:audio" (identified in the link element). The file 1800 also includes a title description for the feed, a category description, and a subtitle description. Although it should be noted that these descriptions will probably be overwritten with the more complete descriptions obtained from the feed directly after the first polling of the feed by the subscription manager 162.

Figure 18:
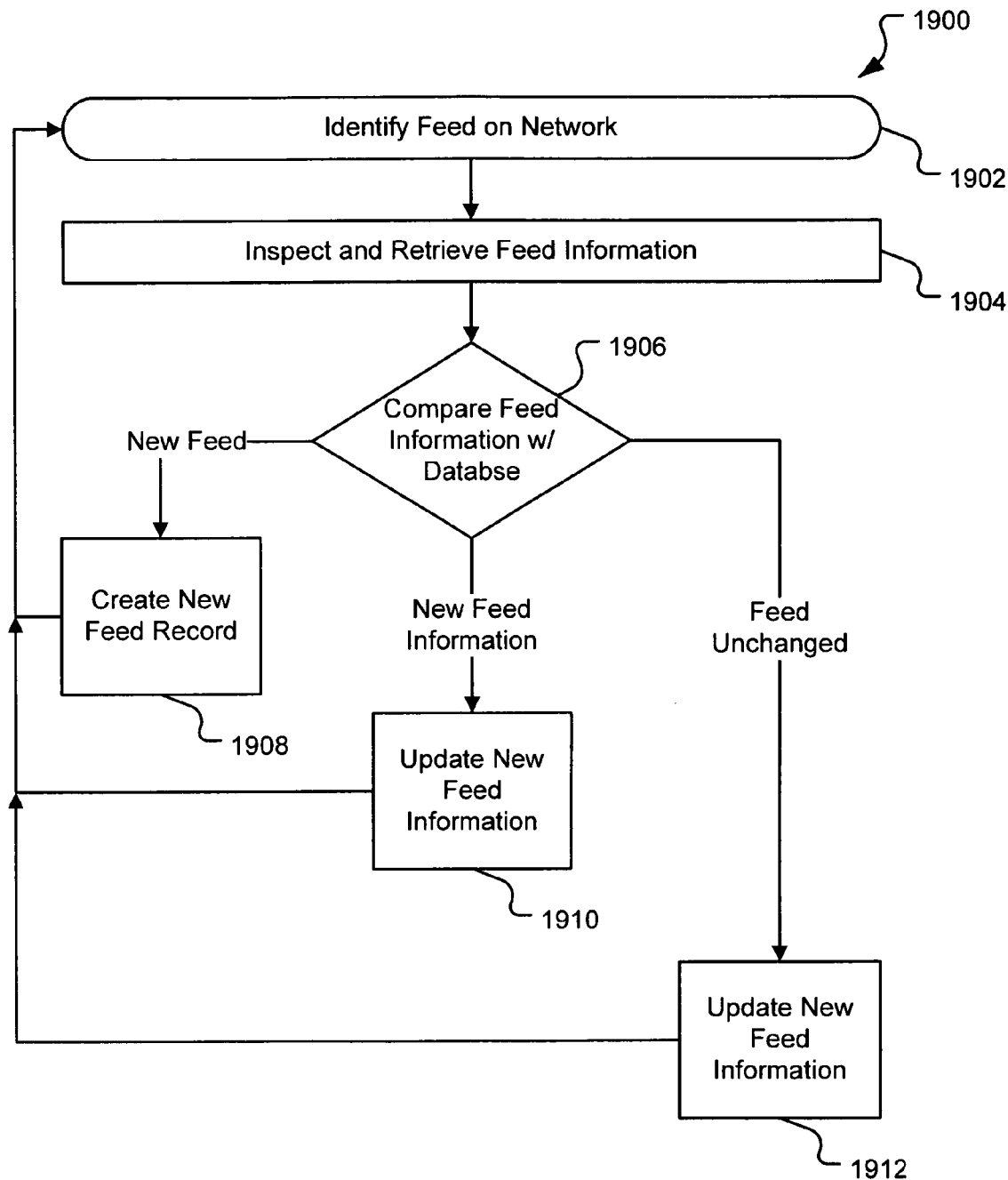
FIG. 18 illustrates another embodiment of a method for searching for feeds using a search engine.

FIG. 18 illustrates another embodiment of a method for searching for feeds using a search engine. The method 1900 starts with the search engine automatically searching a network, such as the Internet, for feeds in an identify feeds operation 1902. In the method 1900, the feeds may be stored locally with respect to the search engine, but it is presumed that most if not all of the podcasts identified will be located at, stored on or accessible via remote computing devices, such as media servers.

As discussed above, the feeds may exist as discrete files, such as files conforming to one of the RSS standards or the ATOM Syndication Format and ATOM Publishing Protocol standards. Alternatively, the feeds may be implemented as a different standard or may be part of or embedded in a webpage or other container. Regardless of how the feeds exist, the search engine is capable of crawling the web and identifying feeds as feeds and extracting at least some feed information from the feeds, such as in the same way a media player or podcatcher would extract the feed information. As discussed above, feed information may include many different types of information including information stored as part of the feed, information that is associated with the feed and information that identifies the location of the feed.

In the identify feed operation 1902, the search engine searches the network and identifies feeds. In an embodiment, the search engine may actively search the Internet or may use a proxy to perform the searching. In yet another embodiment, the search engine may actually search a previously compiled set of search data obtained from another search engine. Regardless of how the search engine is implemented, in the identify feed operation 1902, feeds accessible via the network are found. The feeds may be identified by identifying files conforming to some feed standard, for example by looking for files with a .XML extension that contain an "<rss version=...>" statement or an RSS element within the body of the file.

Each feed identified by the identify operation 1902 is inspected and feed information is retrieved in a retrieve feed information 1904.

The feed information is then compared with feed information stored in the feed database associated with the feed search engine as part of a determination operation 1906. The determination operation 1906 determines if a feed a) is new to the feed database altogether, e.g., the feed database has no record at all of this feed; b) contains new information not currently reflected by the feed database; or c) contains no new information that would require the feed database to be substantively updated with respect to that feed. Here, the word "substantively updated" is used as in an embodiment related information such as the date and time of the last inspection of the feed may be recorded in the feed database so that the feed information for a feed may, in fact, be updated, even though it will be recognized that this update does not reflect a substantively change in the feed itself.

If the determination operation 1906 determines that the feed is new to the feed database altogether, as will be the case the first time the search engine identifies a feed on the network, a new entry or entries in the database will be created in a create new feed record operation 1908. The create new feed record operation 1908 will include copying location information for the feed into the new feed record. This location information will allow a processor to identify the feed on the network. In create new feed record operation 1908 feed information may be retrieved from the identified feed, such as by copying information and data directly from the feed into the feed database. In one embodiment, the entire feed file 152 may be copied into the feed database. As discussed above, the create new feed record operation 1908 may include automatically creating tags for the feed from feed information. After the create new feed record operation 1908, the search engine then returns to the identify feed operation 1902 to continue searching for feeds on the network.

If determination operation 1906 determines that the feed has changed, such as for example a new episode has been added, since the last time the feed was inspected, then the feed information for the feed will be updated to reflect this new information in an update feed information operation 1910. Again, this may include copying some or all of the feed information from the feed into the feed database. After the update feed information operation 1910, the search engine then returns to the identify feed operation 1902 to continue searching for feeds on the network.

If determination operation 1906 determines that the feed contains no new information that would require the feed database to be substantively updated with respect to that feed, then no new feed information need be retrieved from the feed and the feed record may not be updated and the search engine. In an embodiment, the feed record associated with the feed may be updated in an update operation 1912 to indicate when the inspection occurred so that the currency of the feed information for each feed in the feed database is known. The search engine then returns to the identify feed operation 1902 to continue searching for feeds on the network.

The method 1900 is an embodiment of a way to create and maintain a feed database of feeds on a network. The database may then be used as part of a system for searching for feeds on the network and, when coupled with the search engine and GUIs described above, subscribing to feeds easily. Through the methods, systems and GUIs described above, a user can find, subscribe to and render episodes of feeds without explicitly directed their processor to access the locations where the feeds and episodes reside on the network. Such direction may be implicitly supplied by the systems so that, without the user's knowledge, the user's processor automatically performs the actions necessary to subscribe to feeds and retrieve and render episodes in response to the user's commands given only to the subscription server.

In an embodiment, the method 1900 may be repeatedly performed, such as periodically based on some schedule, in order maintain the currency of the feed database. Depending on the time it takes to crawl the network, the method may be repeated in a continuous manner or performed only occasionally in response to search requests received from users of the subscription server.

Those skilled in the art will recognize that the methods and systems of the present invention within this specification may be implemented in many manners and as such is not to be limited by the foregoing exemplary embodiments and examples. In other words, functional elements being performed by a single or multiple components, in various combinations of hardware and software, and individual functions can be distributed among software applications at either the client or server level. In this regard, any number of the features of the different embodiments described herein may be combined into one single embodiment and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present invention covers conventionally known and features of those variations and modifications through the system component described herein as would be understood by those skilled in the art.

What is claimed is:

1. A system comprising:
    a server computer communicatively coupled with a network;
    a data store, in communication with the server computer, containing feed information, each feed accessible from locations on the network remote from the server computer and the data store and, the feed information comprising a list of feeds and associated with each feed in the list, series description information, a remote network location of the feed, and episode information including both episode description information and a network location for one or more episodes of the associated feed;
    a search engine on the server computer that automatically searches the network and retrieves, from locations on the network remote from the server computer and the data store, feed information not already stored in the data store, and stores the retrieved feed information in the data store, the retrieved and stored feed information being based at least in part on behavioral information collected from user interactions with the server computer, the search engine generates a user interface that receives feed search requests from a client device associated with a user;
    a user information database, in communication with the server computer, comprising information related to users' client devices on the network, said information identifying client device types for each client device associated with the user;
    in response to received client search requests, the search engine selects feeds and episodes of feeds based on the feed information in the data store and the received feed search requests, and returns search results to the client device from the data store related to the selected feeds and episodes, the search engine differentiates the client device from other client devices associated with the user based on the type of client device identified from the user information database, said search requests comprise current feed subscription information; and
    wherein the search results include at least some of the series information for selected feeds and episode information for selected episodes, wherein the search results further provide the selected feeds and episode information based upon the type of client device identified from the user information database, said current feed subscription information and usage information of the selected feeds and episodes, wherein said usage information dictates what search results are returned along with how the search results are displayed to the user.

2. The system of claim 1 wherein the data store further comprises:
    tag information associated with one or more feeds, the tag information including at least one tag previously selected by a third party as related to the associated feed.

3. The system of claim 2 wherein the search engine automatically selects at least one tag to be associated with a newly-identified feed based on categorization data within the feed.

4. The system of claim 1 wherein the data store further comprises:
    tag information associated with one or more episodes, the tag information including at least one tag previously selected by a third party as related to the associated episode.

5. The system of claim 1 wherein the episode description information and series description information for each feed include information copied from the feed file located at the remote network location of the feed.

6. The system of claim 1 wherein the feed data store includes third party data associated with at least one of the episodes and at least one of the feeds, the third party data received via the client interface from one or more client devices.

7. The system of claim 1 wherein the search results include a user interface element associated with each selected feed displayed on the client device, the user interface element if activated causing the client device to subscribe to the associated feed.

8. The system of claim 1 wherein the client interface receives feed search requests to display only episodes of feeds matching identified criteria.

9. A method comprising:
   maintaining a feed database comprising a list of feeds accessible at remote network locations on a network and, associated with at least one of the identified feeds, series description information, a remote network location of the feed, and episode information including both episode description information and a network location for each episode of the feed;
   maintaining a user information database comprising information related to users' computer devices on the network, said information identifying a type of computer device for each device associated with each user;
   automatically searching, via the server, the network and retrieving, from locations on the network remote from the server and the feed database, feed information not already stored in the feed database;
   storing, via the server, the retrieved feed information in the feed database, the retrieved and stored feed information being based at least in part on behavioral information collected from user interactions with the server;
   receiving, at the server, a search request from a requesting computer associated with a user to identify feeds on a network matching identified criteria, said search request comprises current feed subscription information;
   selecting feeds and episodes of feeds from the feed database based on the identified criteria and the feed information in the database;
   identifying a type of the requesting computing device, said identifying comprising differentiating the requesting computing device from other client devices associated with the user; and
   transmitting search results to the requesting computer, the search results including series information and remote network locations for selected feeds and episode information for selected episodes, wherein the search results further provide the selected feeds and episode information based upon the type of device the requesting computer is as identified from the user information database, said current feed subscription information and usage information of the selected feeds and episodes, wherein said usage information dictates what search results are returned along with how the search results are displayed to the user.

10. The method of claim 9 wherein the search request is a request to identify only episodes of feeds on the network matching identified criteria and selecting further comprises:
   selecting only episodes of feeds from the feed database.

11. The method of claim 9 wherein the search request is a request to identify only feeds on the network having series information that matches identified criteria and selecting further comprises:
   selecting only feeds from the feeds database.

12. The method of claim 9 wherein the search results include, associated each selected feed, a subscribe interface element that, if selected, subscribes the requesting computer to the associated feed at the remote network location.

13. The method of claim 9 wherein the search results include, for each selected episode, a render interface element that, if selected, causes the requesting computer to retrieve and render the episode.

14. The method of claim 9 wherein the search results include a user interface element associated with a first feed that allows a user of the requesting computer to transmit user-generated information descriptive of the first feed and further comprising:
   receiving the user-generated information from the client computer; associating the user-generated information with the first feed;
   storing the user-generated information associated with the first feed in the database as additional series information for use when selecting feeds in response to search requests.

15. The method of claim 9 wherein the search results include a user interface element associated with a first episode that allows a user of the requesting computer to transmit user-generated information descriptive of the first episode and further comprising:
   receiving the user-generated information from the client computer;
   associating the user-generated information with the first episode;
   storing the user-generated information associated with the first episode in the database as additional episode information for use when selecting episodes in response to search requests.

16. The method of claim 9 wherein maintaining comprises:
   repeatedly searching the network for feeds; revising the feed information in the feed database to include feed information from new feeds and changed feeds identified in the repeatedly searching operation.

17. A computer-readable storage medium tangible encoded with computer-executable instructions, that when executed by a processor, cause a graphical user interface to be visibly displayed on a display of a computing device comprising:
   a text box interface element visibly displayed on the display of the computing device for receiving search criteria;
   a search interface element visibly displayed on the display of the computing device, a selection by a user of the search user interface element causing a server to search an associated feed database for feeds and episodes of feeds matching the search criteria that are accessible at computing devices remote from the server and the computing device, said user selection comprises current feed subscription information, the associated feed database comprises at least feed information automatically retrieved from remote locations by the server, the retrieved feed information being collected based at least in part on behavioral information collected from user interactions via the computing device with the server, the feed information comprising a list of feeds and associated with each feed in the list, series description information, a remote network location of the feed, and episode information including both episode description information and a network location for one or more episodes of the associated feed, the server further differentiates the computing device from other computing devices associated with the user based on the computing device's type which is identified from a user information database; and the search interface element providing the server one or more third-party generated tag interface elements for association with the feeds and the episodes of feeds, and identifying feed information of the feeds and the episodes of feeds matching the search criteria, the identified feed information being provided based upon the type of computing device as identified from the user information database, said current feed subscription information and usage information of the feeds and episodes, wherein said usage information dictates what feeds and episodes are provided along with how the search results are displayed on the display of the computing device.

18. The computer-readable storage medium of claim 17 further comprising:

a first display area displaying a first list of feeds, the first list identifying one or more feeds accessible at computing devices remote from the server and the rendering device.

19. The computer-readable storage medium of claim 18 further comprising:

a render interface element associated with at least one feed identified in the first list, a user selection of the render interface element causing an episode of the feed, the episode located on a computing device remote from the server and the rendering device, to be rendered on the rendering device.

20. The computer-readable storage medium of claim 18 further comprising:

a subscribe interface element associated with at least one feed identified in the first list, a user selection of the subscribe interface element causing the server to generate and transmit information to the rendering device causing the rendering device to subscribe to the feed.

21. The computer-readable storage medium of claim 20 wherein the information transmitted to the rendering device includes a file conforming to the .pcast standard.

22. The computer-readable storage medium of claim 17 further comprising:

a search limiter interface element through which a user may limit a search to search for only feeds, only episodes or feeds and episodes that match the search criteria.

23. The computer-readable storage medium of claim 17 further comprising:

the one or more tag interface elements that, when selected by a user, causes the server to search the associated feed database for feeds and episodes of feeds matching the tag that are accessible at computing devices remote from the server and the rendering device.

24. The computer-readable storage medium of claim 23 wherein the one or more tag interface elements include a first tag interface element comprising a first tag, that when selected by a user, causes the server to search the associated feed database for feeds and episodes of feeds having the first tag, wherein the first tag was provided by a first source; and a second tag interface element comprising the first tag displayed in manner such that the second tag interface is visually different from the first tag interface, the second tag interface when selected by a user causes the server to search the associated feed database for feeds and episodes of feeds having the first tag, wherein the first tag was provided by a second source.

* * * * *